United States Patent
Bikson

(10) Patent No.: US 11,629,239 B2
(45) Date of Patent: Apr. 18, 2023

(54) PREPARATION OF MESOPOROUS POLY (ARYL ETHER KETONE) ARTICLES AND USE THEREOF

(71) Applicant: Avanpore LLC, Newton, MA (US)

(72) Inventor: Benjamin Bikson, Newton, MA (US)

(73) Assignee: Avanpore LLC, Newton, MA (US)

( * ) Notice: Subject to any disclaimer, the term of this patent is extended or adjusted under 35 U.S.C. 154(b) by 0 days.

(21) Appl. No.: 17/966,172

(22) Filed: Oct. 14, 2022

(65) Prior Publication Data

US 2023/0050009 A1 Feb. 16, 2023

Related U.S. Application Data

(63) Continuation of application No. 17/740,897, filed on May 10, 2022, now Pat. No. 11,505,671.

(60) Provisional application No. 63/211,242, filed on Jun. 16, 2021.

(51) Int. Cl.
| | |
|---|---|
| *C08J 9/28* | (2006.01) |
| *B01J 20/26* | (2006.01) |
| *B01J 20/30* | (2006.01) |
| *B01D 67/00* | (2006.01) |

(52) U.S. Cl.
CPC .............. *C08J 9/28* (2013.01); *C08J 2201/05* (2013.01); *C08J 2205/042* (2013.01); *C08J 2333/24* (2013.01); *C08J 2371/00* (2013.01)

(58) Field of Classification Search
CPC .. C08J 9/28; C08J 2201/05; C08J 2205/2042; C08J 2333/24; C08J 2371/00; C08J 9/36; C08J 2201/046; C08J 2371/10; C08J 2479/08; C08J 9/26; B01J 20/262; B01J 20/28023; B01J 20/28057; B01J 20/28069; B01J 20/28078; B01J 20/305; B01J 20/3078; B01D 67/003; B01D 69/08; B01D 71/52

See application file for complete search history.

(56) References Cited

U.S. PATENT DOCUMENTS

| | | |
|---|---|---|
| 4,721,732 A | 1/1988 | Dubrow et al. |
| 4,897,307 A | 1/1990 | Beck et al. |
| 5,200,078 A | 4/1993 | Beck et al. |

(Continued)

FOREIGN PATENT DOCUMENTS

WO WO2007051307 5/2007

OTHER PUBLICATIONS

Franchina et al., "Surface Modifications of Poly (ether ether ketone)," Macromolecules 1991, 24, 3045-3049. (Year: 1991).*

(Continued)

*Primary Examiner* — Kara B Boyle
(74) *Attorney, Agent, or Firm* — Forge IP, PLLC

(57) ABSTRACT

Mesoporous poly (aryl ether ketone) articles are formed from blends of poly (aryl ether ketones) with pore forming additives by melt processing, and can be in the form of a monofilament, disc, film, microcapillary or other complex shapes. The method of formation provides for preparation of poly (aryl ether ketone) articles with high degree of surface area and uniform nanometer pore size. The preferred poly (aryl ether ketone)s are poly (ether ketone) and poly (ether ether ketone). The mesoporous articles formed by the method of the present invention are useful for a broad range of applications, including molecular separations and organic solvent filtration.

11 Claims, 8 Drawing Sheets

(56) References Cited

U.S. PATENT DOCUMENTS

| | | | |
|---|---|---|---|
| 5,205,968 | A | 4/1993 | Damrow et al. |
| 5,227,101 | A | 7/1993 | Mahoney et al. |
| 6,017,455 | A | 1/2000 | Shimoda et al. |
| 6,887,408 | B2 * | 5/2005 | Yuan .................. B01D 69/12 521/64 |
| 7,022,798 | B2 | 4/2006 | King |
| 7,176,273 | B2 | 2/2007 | Yuan et al. |
| 7,229,580 | B2 | 6/2007 | Yuan |
| 7,368,526 | B2 | 5/2008 | Yuan et al. |
| 7,439,291 | B2 | 10/2008 | Wang et al. |
| 9,610,547 | B2 | 4/2017 | Ding et al. |
| 10,328,425 | B2 | 6/2019 | Haring |
| 10,376,846 | B2 | 8/2019 | Ding et al. |
| 2006/0094852 | A1 * | 5/2006 | Yuan .................. C08J 9/26 528/125 |
| 2013/0112619 | A1 | 5/2013 | Livingston et al. |

OTHER PUBLICATIONS

Bristow, J.F., et al., "Investigation of semicrystalline morphology in poly(ether ether ketone)/poly(ether imide) blends by dielectric relaxation spectroscopy"; Polymer vol. 38 No. 2, pp. 287-295, 1997.

Burgal J., et al., "Controlling molecular weight cut-off of PEEK nanofiltration membranes using a dryingmethod"; Journal of Membrane Science 493 (2015) 524-538.

Chen, Y., et al., "Preparation of antifouling poly (ether ether ketone) hollow fiber membrane by ultraviolet grafting of polyethylene glycol"; Materials Today Communications 27 (2021) 102326.

Chen, G., et al., "Pore Structure and Properties of PEEK Hollow Fiber Membranes: Influence of the Phase Structure Evolution of PEEK/PEI Composite"; Polymers 2019, 11, 1398; doi:10.3390/polym11091398.

Diez-Pascual, A.M., et al., "Synthesis and Characterization of Poly(ether ether ketone) Derivatives Obtained by Carbonyl Reduction"; Macromolecules, vol. 42, No. 18, 2009; pp. 6885-6892.

Ding, Y., et al., "Preparation and characterization of semi-crystalline poly(ether ether ketone) hollow fiber membranes"; Journal of Membrane Science 357 (2010) 192-198.

Ding, Y., et al., "Macro and meso porous polymeric materials from miscible polysulfone/polyimide blends by chemical decomposition of polyimides"; Polymer 51 (2010) 46-52.

Henneuse, C., et al., "Surface carboxylation of PEEK film by selective wet-chemistry"; Polymer vol. 39, No. 4, 1998, pp. 835-844.

Henneuse-Boxus, C., et al., "Surface functionalization of PEEK films using photochemical routes"; European Polymer Journal 37 (2001) 9-18.

Henneuse-Boxus, C., et al., "Surface amination of PEEK film by selective wet-chemistry" Polymer vol. 39 No. 22, pp. 5359-5369, 1998.

Henneuse-Boxus, C., et al., "Covalent attachment of fluorescence probes on the PEEK-OH film surface"; Polymer 41 (2000) 2339-2348.

Huang, T., et al., "Pore structure and properties of poly(ether ether ketone) hollow fiber membranes: influence of solvent-induced crystallization during extraction"; PolymInt 2019; 68: 1874-1880.

Kalika, D.S., et al., "Dynamic Relaxation Behavior of Solvent-Crystallized Poly( ether ether ketone)"; Journal of Polymer Science: Part B Polymer Physics, vol. 32, 759-770 (1994).

Kalika, D.S., et al., "Relationship between Morphology and Glass Transition Temperature in Solvent-Crystallized Poly (aryl ether ketones)"; Journal of Polymer Science: Part B: Polymer Physics, vol. 36, 65-73 (1998).

Kyomoto, M., et al., "Self-Initiated Surface Graft Polymerization of 2-Methacryloyloxyethyl Phosphorylcholine on Poly (ether ether ketone) by Photoirradiation"; Applied Materials & Interfaces vol. 1, No. 3, 537-542, 2009.

Lovinger, A.J., et al., "Solution Crystallization of Poly(ether ether ketone)"; Macromolecules, vol. 19, No. 7, 1986, pp. 1861-1867.

Mehta, R.H., et al., "Microporous membranes based on poly(ether ether ketone) via thermally-induced phase separation"; Journal of Membrane Science 107 (1995) 93-106.

Mehta, R.H., et al., "Characteristics of Poly (ether ether ketone) Microporous Membranes Prepared via Thermally Induced Phase Separation (TIPS)"; Journal of Applied Polymer Science, vol. 66, 2347-2355 (1997).

Noiset, O., et al., "Surface Modification of Poly (aryl ether ether ketone) (PEEK) Film by Covalent Coupling of Amines and Amino Acids through a Spacer Arm"; Journal of Polymer Science: Part A: Polymer Chemistry, vol. 35, 3779-3790 (1997).

Noiset, O., et al., "Surface Reduction of Poly(aryl ether ether ketone) Film: UV Spectrophotometric, 3H Radiochemical, and X-ray Photoelectron Spectroscopic Assays of the Hydroxyl Functions"; Macromolecules 1997, 30, 540-548.

* cited by examiner

PREPARATION OF MESOPOROUS POLY (ARYL ETHER KETONE) ARTICLES AND USE THEREOF

FIELD OF THE INVENTION

This invention relates to the preparation and use of mesoporous polymeric articles manufactured from poly (aryl ether ketones). More particularly, the teachings of the present invention are directed to the preparation of chemically and solvent resistant mesoporous polymeric materials with controlled narrow pore size distribution of nanometer size pores formed from poly (aryl ether ketones). The preformed porous materials can be surface functionalized while preserving the mesoporous morphology.

BACKGROUND OF THE INVENTION

Structured organic or inorganic porous materials that exhibit pore diameters of nanometer scale (nanoporous materials) are of great industrial importance. The diameter of pores in nanoporous materials is below 100 nanometers. Terminology for nanoporous materials can be confusing because there is an alternative system in widespread use developed by the International Union of Pure and Applied Chemistry (IUPAC). The IUPAC system defines materials with pore size in the 2 to 50 nm range as mesoporous. Thus, mesoporous and nanoporous terminology is frequently applied to materials with nanometer size pores.

The surface area of solids increases as they become nanoporous, improving catalytic, absorbent and adsorbent properties. The surface area of nanoporous materials is generally in hundreds of square meters per gram. Nanoporous solids have been made from numerous materials—carbons, silica, ceramics, metals and various organic materials and polymers. Most common commercial nanoporous materials are inorganic in nature. Zeolites with controlled nanopore structure have been used as catalysts or selective adsorbents for decades. New classes of hybrid organic-inorganic materials like metal-organic frameworks (MOFs) comprised of metal ions coordinated to organic ligands have emerged as a new class of high surface area nanoporous materials. More recently, organic materials with nanometer size pores comprised of covalent organic frameworks (COFs) have been developed with exceptionally high surface areas. However, fabrication of high surface area articles with nanometer size pores from commercial polymers to date has been limited. Fabrication of shaped articles from high temperature commercial polymers with nanometer pore structure by melt processing is particularly desired. The high throughput processing methodologies, such as extrusion, injection molding and 3D printing, allow fabrication of low-cost articles from commercially available polymers. Thus, there is still a need in the art to fabricate porous materials of a desirable shape by melt processing that exhibit nanometer size pores.

Most nanoporous materials can be classified as bulk materials or membranes. A nanoporous material with consistently sized pores has the property of letting only molecules of certain size pass through, while blocking others. These characteristics are of a critical importance for membrane fluid separation applications. Porous polymeric membranes are well known in the art and are used widely for filtration and purification processes, such as filtration of wastewater, desalination, preparation of ultra-pure water and in medical, pharmaceutical or food applications, including removal of microorganisms, dialysis and protein filtration. A membrane is generally defined as a selective barrier if it permits passage of one or more components through the membrane while retaining one or more components. Porous polymeric membranes are used to separate components of liquid mixtures by membrane distillation and as contactors to facilitate dissolution of gases in liquids or to remove gases from liquids, as membrane bioreactors, and in numerous other applications where they serve as a generic phase separator, for example, as a battery separator. The application spectrum of membrane processes stretches from filtration of solids up to separations in a molecular range. Pressure driven membrane processes, such as microfiltration (MF), ultrafiltration (UF), nanofiltration (NF) and reverse osmosis (RO), are established large-scale industrial processes for water purification and recovery of high value substances. Initially applied to water-based systems, membrane separations are increasingly applied to non-water solvent-based systems as well.

Commercial porous materials fabricated from thermoplastic polymers exhibit limited solvent and thermal resistance that limits the scope of their application. Preparation of nanoporous materials from high temperature thermoplastic polymers on a commercial scale is virtually unknown. The poly (aryl ether ketones) are polymeric materials with exceptional thermo-mechanical properties and chemical/solvent resistance. It is an object of the instant invention to develop a commercially scalable method of forming porous materials with nanometer size pores from poly (aryl ether ketone) polymers.

Preparation of porous materials from poly (aryl ether ketones) has been largely limited to the family member poly (ether ether ketone), PEEK. Furthermore, development of porous PEEK materials was limited to membrane applications almost exclusively. A number of methods to prepare porous PEEK membranes have been disclosed in the art. It is known to prepare porous PEEK membranes from solutions of strong acids, such as concentrated sulfuric acid. However, PEEK can undergo sulfonation in the concentrated sulfuric acid media and thus can lose some of its desirable sought after properties. U.S. Pat. No. 6,017,455 discloses preparation of non-sulfonated porous PEEK membranes from concentrated sulfuric acid solvents sufficiently diluted by water to prevent sulfonation. The membranes are formed by casting PEEK solution to form a film followed by coagulation in a concentrated sulfuric acid. This membrane preparation process is complicated and produces large amounts of waste acid.

U.S. Pat. No. 5,997,741 discloses preparation of porous PEEK membranes by forming a solution of PEEK polymer in a concentrated sulfuric acid at the temperature of 15° C. or lower to prevent sulfonation. The solution is processed and cast at a sub ambient temperature, followed by coagulation in water or in a concentrated sulfuric acid. Only dilute PEEK solutions can be formed in the concentrated sulfuric acid, which adversely affects film forming characteristics, the mechanical characteristics, and the pore morphology of the thus formed porous PEEK membranes.

U.S. Pat. Nos. 4,992,485 and 5,089,192 disclose preparation of porous PEEK membranes from non-sulfonating acid solvents, which include methane sulfonic acid and trifluoromethane sulfonic acid. European Patent Specification EP 0737506 discloses preparation of improved polymeric membranes based on PEEK admixtures with polyethylene terephthalate. The membranes are formed by the solution casting process from a methane sulfuric acid/sulfuric acid solvent mixture.

The acid based solvent systems for manufacture of porous PEEK membranes disclosed in the art are highly corrosive, frequently toxic and generate substantial environmental and disposal problems. For these and other reasons, the acid-based casting processes have found limited commercial use.

An alternative to the acid based solvent system for PEEK membrane preparation involves the use of high boiling point solvents and plasticizers that dissolve PEEK polymer at elevated temperatures. U.S. Pat. Nos. 4,957,817 and 5,064,580, both issued to Dow Chemical Co., disclose preparation of porous PEEK articles from its admixture with organic polar solvents having a boiling point in the range of 191° C. to 380° C., such as benzophenone and 1-chloronaphthalene, and organic plasticizers capable of dissolving at least 10 weight percent of PEEK, respectively. The final porous article is formed by removing the organic polar solvents and/or plasticizers by dissolution into a low boiling temperature solvent. U.S. Pat. No. 5,200,078 discloses preparation of microporous PEEK membranes from its mixtures with plasticizers wherein the membrane undergoes a drawing step prior to or after the plasticizer is removed by leaching. U.S. Pat. No. 5,227,101 issued to Dow Chemical Co. discloses preparation of microporous membranes from poly(aryl ether ketone) type polymer by forming a mixture of PEEK type polymer, a low melting point crystallizable polymer, and a plasticizer, heating the resulting mixture, extruding or casting the mixture into a membrane, quenching or coagulating the membrane and leaching the pore forming components. U.S. Pat. No. 5,205,968, issued to Dow Chemical Co., discloses preparation of microporous membranes from a blend containing a poly (aryl ether ketone) type polymer, an amorphous polymer and a solvent.

M. F. Sonnenschein in the article entitled "Hollow fiber microfiltration membranes from poly (ether ether ketone)", published in the Journal of Applied Polymer Science, Volume 72, pages 175-181, 1999, describes preparation of PEEK hollow fiber membranes by a thermal phase inversion process. The use of a leachable additive polymer, such as polysulfone, is proposed to enhance membrane performance. Preparation of porous PEEK membranes by coextrusion of PEEK with polysulfone polymers followed by the dissolution of the polysulfone polymer from the interpenetrating network is disclosed in European Patent Application 409416 A2.

It is also known in the art to prepare porous PEEK membranes from its blends with a compatible poly (ether imide) polymer, PEI. Preparation of such membranes is described by R. S. Dubrow and M. F. Froix in U.S. Pat. No. 4,721,732 and by R. H. Mehta et al. in an article entitled "Microporous membranes based on poly (ether ether ketone) via thermally induced phase separation", published in the Journal of Membrane Science, Volume 107, pages 93-106, 1995. The porous structure of these PEEK membranes is formed by leaching the poly (ether imide) component with an appropriate strong solvent such as dimethylformamide. However, as described by Mehta et al., the quantitative removal of PEI component by leaching is essentially impossible which in turn can lead to an inferior porous structure.

Japan Kokai Tokkyo Koho 91273038 assigned to Sumitomo Electric Industries, Ltd., discloses preparation of porous PEEK membranes by an ion track etching method.

M. L. Bailey et al., in U.S. Pat. No. 5,651,931, describe a sintering process for the preparation of biocompatible filters, including PEEK filters. The filters are formed from a PEEK powder of a pre-selected average particle size by first pressing the powder into a "cake" followed by sintering in an oven or furnace. The process is limited to preparation of filters with a relatively large pore size and a broad pore size distribution and does not provide economic means of forming large membrane area fluid separation devices.

A process for preparation of porous PAEK articles that preserves the desirable thermal and chemical characteristics of PAEK polymers has been disclosed in U.S. Pat. No. 6,887,408. The porous articles are prepared from PAEK blends with compatible polyimides. An article of targeted shape is formed from the PAEK/polyimide blend by melt processing followed by removal of the polyimide phase by reaction with a primary amine. The method enables preparation of shaped porous PEEK articles, including hollow fibers membranes. Preparation of such hollow fiber membranes is described by Yong Ding and Ben Bikson in article entitled "Preparation and characterization of semi-crystalline poly (ether ether ketone) hollow fiber membranes", published in the Journal of Membrane Science, volume 357 (2010), p. 192-198. Preparation of hollow fiber membranes by this methodology is further described by Gong Chen, Yuan Chen, Tingjian Huang, Zhongchen He, Jianjun Xu and Pengqing Liu, in the article entitled "Pore Structure and Properties of PEEK Hollow Fiber Membranes: Influence of the Phase Structure Evolution of PEEK/PEI Composite", Polymers, Volume 11 (2019), p. 1398.

D. Morrisette and P. Croteu, in PCT application, International Publication Number WO 2007/051309, disclose porous PEEK material suitable for medical implant devices. The porous material is formed by mixing dissolvable material with PEEK in a molten form and subsequently removing the dissolvable material. The disclosed dissolvable material is a salt. The method capable of forming PEEK materials with very large pore size and irregular pore structure.

M. C. Iliuta et al., in U.S. Pat. No. 9,908,985, disclose preparation of microporous hydrophobic polymeric hollow fibers. The hollow fibers are prepared by melt processing from mixture of polymer with micron size NaCl particles followed by salt dissolution. The hollow fiber is reported to be non-wetting and useful for gas transfer contacting applications.

Poly (aryl ether ketones) are high performance engineering polymers that exhibit exceptional thermal and chemical characteristics and are thus highly sought after as porous substrates for applications that require solvent and thermal resistance. However, the properties that make PAEK polymers desirable also make preparation of porous media difficult. In contrast, the chemical resistance of PAEK polymers enables chemical modification of preformed polymer surfaces without alteration of the underlying structure.

It was found surprisingly that poly (aryl ether ketone) articles with nanometer size pores and high surface area can be formed from amorphous poly (aryl ether ketones)/polyimide precursor articles by a solvent treatment process. The non-porous poly (aryl ether ketones)/polyimide precursor article of a desired shape is formed first by melt processing. Following solvent treatment, the article is converted into a high surface area porous material with nanometer size pores.

SUMMARY OF THE INVENTION

Disclosed is the preparation of poly (aryl ether ketone) articles (PAEK) with nanometer size pores that exhibit mesoporous morphology. The articles are prepared from blends of PAEK polymers with a pore forming material (porogen). A precursor non-porous article of a desired shape is prepared from the PAEK/porogen blend. The article is subjected to a crystallization step that leads to phase separation between the polymer and porogen. The porogen is a pore forming material that is removed following the crystallization step to provide the final porous PAEK article The precursor shaped article is substantially amorphous and undergoes crystallization in a follow up process step. The preferred method of inducing precursor article crystallization is a solvent induced crystallization. The solvent selection and treatment conditions are optimized to affect crystallization of PAEK polymer phase to attain a desired initial crystalline morphology. It was found surprisingly that crystalline morphology, and in particular crystal size, affect the final pore morphology and pore size following the removal of the pore forming material. The solvent treatment step can be further followed by a thermal annealing step.

In one embodiment, the mesoporous poly (aryl ether ketone) article is formed by a method comprising: (a) forming a blend of poly (aryl ether ketone) type polymer with a pore forming material (porogen); (b) forming a shaped article from the blend by melt processing, wherein the formed article is non-porous and substantially amorphous; (c) subjecting said article to a solvent treatment step that induces crystallization in the article; (d) removing the pore forming material from the article; and (e) recovering thus formed porous article. In some embodiments, the solvent treatment step is followed by a high temperature annealing/heat treatment step. The preferred pore forming additives are polyimides that form miscible blends with poly (aryl ether ketones).

In another embodiment, the mesoporous poly (aryl ether ketone) article is formed by a method comprising: (a) forming a blend of a poly(aryl ether ketone) polymer with a polyimide; (b) forming a shaped article from the blend by melt processing, wherein the formed article is substantially amorphous; (c) subjecting the surface of the shaped article to a solvent treatment step that induces crystallization in the shaped article; (d) subjecting the shaped article to a thermal annealing step to complete crystallization; (e) removing the polyimide from the surface of the shaped article to a predetermined depth to form a mesoporous surface layer by bringing the shaped article into contact with a primary amine or hydrazine to affect decomposition of the polyimide; and (f) recovering the mesoporous poly (aryl ether ketone) article that contains the mesoporous surface layer and a solid core.

In a further embodiment, the mesoporous poly (aryl ether ketone) article is formed by a method comprised of the following steps: (a) coextruding a first poly(aryl ether ketone) polymer with a blend of a second poly(aryl ether ketone) polymer with a polyimide to form a shaped multi-layer dense article, wherein the shaped article is substantially amorphous; (b) subjecting the shaped article to a treatment step to crystallize the first and the second poly(aryl ether ketone) polymers throughout the shaped article; (c) removing the polyimide from a layer of the shaped article, comprised of the blend of the second poly(aryl ether ketone) polymer with the polyimide, to form a mesoporous surface layer by bringing the shaped article into contact with a primary amine or hydrazine to affect decomposition and removal of the polyimide; and (d) recovering the mesoporous poly (aryl ether ketone) article that contains the mesoporous surface layer and a solid core.

The above and other features of the invention, including various novel details of construction and combinations of parts, and other advantages, will now be more particularly described with reference to the accompanying figures and pointed out in the claims. It will be understood that the particular method and articles embodying the invention are shown by way of illustration and not as a limitation of the invention. The principles and features of this invention may be employed in various and numerous embodiments without departing from the scope of the invention.

BRIEF DESCRIPTION OF THE DRAWINGS

FIG. 1A shows nitrogen adsorption and desorption isotherms, while FIG. 1B shows pore size distribution.

FIG. 2A shows nitrogen adsorption and desorption isotherms, while FIG. 2B shows pore size distribution.

FIG. 3A shows nitrogen adsorption and desorption isotherms, while FIG. 3B shows pore size distribution.

FIG. 4A shows nitrogen adsorption and desorption isotherms, while FIG. 4B shows pore size distribution FIG. 5A shows nitrogen adsorption and desorption isotherms, while FIG. 5B shows pore size distribution.

FIG. 7A shows nitrogen adsorption and desorption isotherms, while FIG. 7B shows pore size distribution.

DETAILED DESCRIPTION OF THE PREFERRED EMBODIMENTS

Figure 1A:
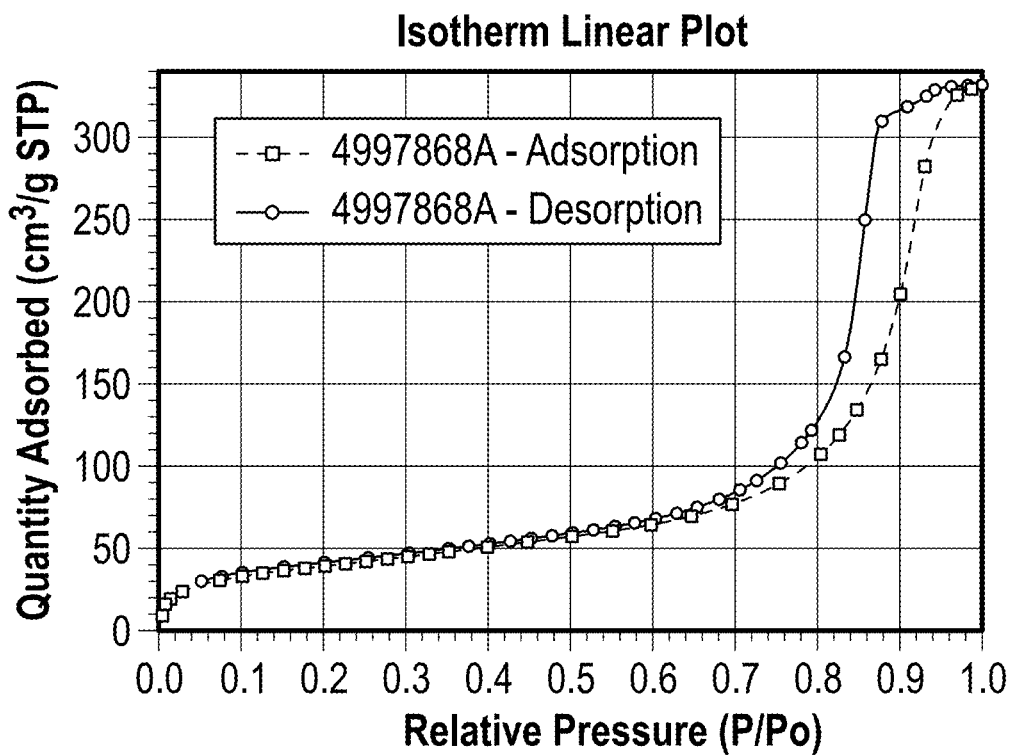
FIGS. 1A and 1B illustrate a nitrogen adsorption BET analysis of mesoporous PEEK hollow fibers prepared by the solvent induced crystallization with acetone. Specifically.

The present invention provides for a novel process for the preparation of mesoporous poly (aryl ether ketone), PAEK, articles of controlled pore sizes. It was found surprisingly that mesoporous materials with nanometer pore sizes can be prepared from blends of poly (aryl ether ketones) with pore forming materials, such as polyimides via use of a solvent treatment process. The porous articles of this invention are formed from poly (aryl ether ketone), PAEK, polymers. The method of the present invention provides for preparation of mesoporous PAEK materials with uniform, narrow pore size distribution and high surface area. According to IUPAC nomenclature a mesoporous material is a material containing pores with diameters between 2 and 50 nm. For comparison, IUPAC defines microporous material as a material having pores smaller than 2 nm in diameter and macroporous material as a material having pores larger than 50 nm in diameter. The porous materials of this invention exhibit an average pore diameter between 5 and 100 nm which is defined herein as being substantially mesoporous or nanoporous. In some embodiments of this invention, the porous PAEK articles contain structural segments that differ in pore size; this includes porous materials that contain two or more layers of different pore sizes. The layers can contain mesopores that differ in pore size or the article can be composed of mesoporous and macroporous layers. In some embodiments, one of the layers in the PAEK article may exhibit a bimodal pore distribution that contains mesopores and macropores. It is further within the scope of this invention to form PAEK articles with a solid non-porous core and a mesoporous exterior layer.

The porous poly (aryl ether ketone) articles are defined as articles consisting of polymers containing a plurality of aryl ether ketone segments in the polymeric backbone. A number of poly (aryl ether ketone) polymers are available commercially, including poly (ether ketone), poly (ether ether ketone), poly (ether ketone ketone), poly (ether ether ketone ketone), poly (ether ketone ether ketone ketone) and copolymers collectively referred herein as poly (aryl ether ketones). Poly (aryl ether ketones) have a weight average molecular weight in the range of 20,000 to 1,000,000 Daltons, typically between 30,000 to 500,000 Daltons. Preferred poly (aryl ether ketones) used to form porous PAEK articles of this invention are semi-crystalline, and are insoluble in common organic solvents at room temperature. Most preferred poly (aryl ether ketones) used to form porous PAEK articles of this invention are poly (ether ether ketone), PEEK, poly (ether ketone), PEK, poly (ether ketone ketone), PEKK, poly (ether ether ketone ketone), PEEKK, and poly (ether ketone ether ketone ketone), PEKEKK. A number of poly (aryl ether ketones) are manufactured by Victrex Corporation under the trade names Victrex® PEEK, Victrex® PEEK HT, and Victrex® PEEK ST. Poly (ether ether ketone) is further available from Solvay under trade name KetaSpire™ and another poly (aryl ether ketone) is available from Solvay under the trade name AvaSpire®. Poly (ether ether ketone) is further available from Evonik Corporation under the trade name VESTAKEEP®.

The porous PAEK articles of this invention are formed from a precursor non-porous PAEK blend with a pore forming material. The non-porous article is converted into a porous article in subsequent steps. The preferred method of forming the precursor non-porous PAEK article is by melt processing. The preparation of the precursor article typically consists of the following steps: (1) Forming a blend of poly (aryl ether ketone) polymer with a pore forming material (porogen) by melt blending. The porogen is alternatively a diluent (a high boiling, low molecular weight liquid or solid), an intermediate molecular weight oligomer, a polymer or a mixture thereof; (2) Forming a shaped article from the blend by melt processing, such as extrusion, casting, molding or 3D printing; and (3) Solidifying the shaped article by rapid cooling. The thus formed article can be in the form of a sheet, film, disc, sphere, monofilament, micro capillary or other complex shapes. The article is substantially amorphous and must be converted into a semicrystalline form in subsequent steps.

Porogens can include high boiling solvents, compatible oligomers, nanoparticles or compatible or semi-compatible polymers. The use of compatible polymers or their mixtures with partially compatible polymers or nanoparticles as porogens is generally preferred. Preferred polymeric porogens include polysulfones, such as poly (ether sulfone), poly (ether ether sulfone), biphenol based polysulfones and bisphenol A based polysulfone, polycaprolactone, polyimides or mixtures thereof. The nanoparticles are soluble organic or inorganic materials. Inorganic nanoparticles, such as sodium chloride and sodium carbonate, are preferred. The most preferred polymeric porogens are aromatic polyimides. Poly (aryl ether ketone) type polymers form compatible blends with certain aromatic polyimides, PI. Removal of the polyimide component from such blend articles by solvent extraction, however, can be difficult due to polymer chain entanglement. The polyimide can be quantitatively removed by selective chemical decomposition of the polyimide phase to form the final porous article. This method of porous PAEK material preparation wherein the polyimide is chemically decomposed and removed from the article is referred to as reactive porogen removal process, RPR.

Polyimides that form a compatible precursor blend with poly (aryl ether ketone) polymers are defined as polymers containing

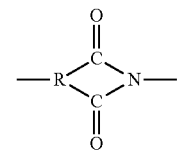

linkages and include aliphatic and aromatic polyimides, copolyimides and polyimide block and graft copolymers, wherein the polyimide is defined as a molecule that contains at least two imide linkages. Additional polyimides include aromatic polyamide imides, polyhydrazine imides and polyester imides. Aromatic polyimides are particularly useful for the preparation of porous articles of this invention. The most preferred polyimide is poly (ether imide), PEI, of the following formula:

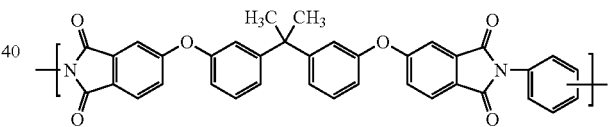

and poly (ether imide) copolymers manufactured by the Sabic Industries under trade names Ultem® 1000 Ultem® XH1010F, Ultem® 6050 and Siltem® STM1500. The copolymers that contain dimethylsiloxane or sulfone units are examples of representative copolymers. Another preferred polyimide is Aurum® manufactured by Mitsui and distributed by DuPont Engineering Polymers.

The polyimides can be used as a single additive component or as a mixture of polyimides. The polyimides typically have an average molecular weight in the range of 500 to 1,000,000 Daltons, preferably between 1,000 to 500,000 Daltons.

Mixtures of poly (ether imide) with poly (ether sulfone), PES, poly (ether ether sulfone), PEES, or polycaprolactone as well as PEI mixtures with soluble nanoparticles are also within the scope of the present invention. The preferred soluble nanoparticles are salt nanoparticles, such as sodium chloride nanoparticles available from Nanoshel. These pore forming components supplement the PEI pore forming material and augment pore structures formed from bicomponent PAEK/PEI blends. These supplemental additives are considered compatible PEI components. PAEK non-porous precursors prepared from blends containing multiple pore forming components exhibit bimodal pore distributions that combine mesopores below 100 nanometer size with macropores above 0.1 micron size. The PAEK polymer concentrations in blends containing multiple pore forming components range from 20 to 60 percent by weight, while PEI/ supplemental compatible component weight ratios in the multi component blends range from 20/80 to 80/20. The concentration of poly (aryl ether ketone) in these multicomponent blend compositions ranges from 20 to 60 percent by weight and the nanoparticles weight ratios to the total amount of pore forming materials in the multi component blends range from 20/80 to 80/20.

Preparation of binary poly (aryl ether ketone)/polyimide blends or multicomponent blends can be carried out by mixing components in a molten stage, such as by blending in a single or twin extruder, and other methods conventionally employed in the polymer compounding industry. The use of a twin extruder is the preferred method of blending. A plasticizer can be optionally added to aid processing. The poly (aryl ether ketone)/polyimide blends form compatible blend compositions. The compatible blend typically exhibits a single glass transition temperature. The compatible composition is defined as capable of forming nanoporous poly (aryl ether ketone) articles with inter-connected pore structure and majority fraction of pore volume having pore diameter in the range of 5 to 100 nanometers. Preferred blends are PEEK/PEI blends that form poly (aryl ether ketone) articles with inter-connected pore structure and an average pore diameter of 70 nm or less, most preferably 25 nm or less. The multicomponent PEEK/PEI/compatible additive blends that form poly (aryl ether ketone) articles with inter-connected pore structure and bimodal pore distribution with combination of meso and macro pores are also within the scope of the invention. The mesopore diameter is below 100 nanometers while macropore diameter is in the range of 0.1 to 5 micron. The specific use of the PAEK article determines the desired pore size and pore size distribution that, in turn, is determined by PAEK and polyimide selection and by PAEK/PEI ratio. Incorporation of supplementary PEI competitive additives into blend compositions and downstream processing conditions, such as annealing temperature, further affect PAEK article morphology and can be used to tailor porous structure towards the specific application.

The porous materials of this invention are formed preferably from blends of PAEK polymers with polyimides. The poly (aryl ether ketone) and the polyimide are selected to form a substantially miscible blend, preferably an alloy. An article of a desired shape is formed from the PAEK/polyimide blend in the initial step. The initial article is non-porous. The polyimide is removed from the article in a subsequent step to form the porous structure. To attain the desired high thermo-mechanical properties and chemical resistance the porous PAEK article must be semi-crystalline. Namely, a substantial fraction of the polymer phase is crystalline. The degree of crystallinity of the mesoporous article thus must be high, preferably above 20%, most preferably above 30%. The crystallization of the PAEK material in the blend must take place prior to removal of the polyimide component. The crystallization rate of PAEK/polyimide blends is retarded by the polyimide phase and is slow. The precursor non-porous article is preferably formed by melt processing that may include extrusion, compression molding, injection molding or 3D printing. These processes are high throughput processes; the shaped article is formed at a fast-cooling rate. A substantially amorphous article is formed under these processing conditions due to the slow crystallization rate. The thus formed substantially amorphous article must be subjected to a crystallization step before the polyimide pore forming component can be removed. A substantially amorphous article typically exhibits a degree of crystallinity below 5%.

The crystallization of the PAEK phase in the blend conventionally is carried out by a thermal treatment (sometimes called cold crystallization). The article is brought to a temperature above the glass transition temperature of the blend to induce chain mobility and affect crystallization. This step is sometimes also referred to as the annealing step. Crystallization of the PAEK polymer phase follows and is accompanied by phase separation wherein the polyimide is expelled from the crystalline regions and is concentrated in the amorphous phase. In the final step of forming the porous article, the polyimide is removed from the article to form the porous structure. It is known in the art that the annealing temperature affects the size of crystals in the material which, in turn, affects the pore size. High annealing temperatures lead to the formation of larger crystals and thus larger size pores in the final article.

It was found surprisingly that amorphous non-porous PAEK/polyimide based articles can be treated in certain solvents to affect crystallization. The solvent treatment provides for a unique crystalline structure that leads to the formation of a mesoporous material following the polyimide phase removal. The solvent selection and treatment conditions can be used to control pore size. In addition to solvent selection, treatment temperature and duration of the treatment affect the final pore morphology. The solvent treatment alone can be used to develop the crystalline structure or the initial solvent treatment can be followed by a subsequent thermal annealing. The thermal annealing is preferably carried out at a temperature between 250° C. and 310° C.

It is important to attain a high degree of crystallinity in the porous material. All porous PAEK materials of this invention are semi-crystalline. Namely, a fraction of the poly (aryl ether ketone) polymer phase is crystalline. A high degree of crystallinity is preferred since it imparts solvent resistance and improves thermo-mechanical characteristics in the final shaped porous PAEK article. In some embodiments of this invention, the degree of crystallinity is at least 10%, preferably at least 20%, most preferably at least 30%.

While not being held to a specific mechanism, it is hypothesized that certain solvents induce mild swelling of the PAEK/polyimide blend that increases chain mobility sufficient to trigger direct crystallization of the PAEK phase. The semi-crystalline morphology formed under solvent induced crystallization consists of small size crystals that, in turn, leads to the formation of smaller size pores in the porous article following the polyimide phase removal. Some solvent treatments do not result in a high degree of crystallinity but rather generate small proto-crystals. Once the solvent treatment is followed by the thermal treatment, the proto-crystals act as seeds to generate semi-crystalline morphology consisting of a large number of small size crystals. This, in turn, leads to the formation of smaller size pores upon the polyimide phase removal.

Swelling of the blend article is diffusion controlled and proceeds from the surface of the article inwards. The solvent must swell the blend material to induce sufficient chain mobility to trigger crystallization. For a given solvent the diffusion rate is temperature dependent. The time temperature superposition can be used to control the depth of solvent penetration into the article. The article thus can be solvent treated to a controlled depth. After the article is treated to the desired predetermined depth the treatment is arrested and the solvent is removed from the article. The article is further subjected to a thermal treatment above the glass transition temperature to affect and complete crystallization through the entire article. Thermal treatment at high temperatures but below the melting point of the crystalline phase generates a high degree of crystallinity in the article with a concomitant morphology composed of large crystal sizes. Following the polyimide phase removal, this method generates a layered asymmetric pore structure wherein the surface layer, that was subjected to the solvent treatment, contains smaller size pores and the interior of the article contains larger size pores. The surface layer thickness for a given solvent selected can be controlled by the temperature and duration of the treatment. Porous PAEK fluid separation membranes prepared by this method can contain a thin surface layer composed of small pores and the interior support layer composed of substantially larger pores. The surface layer determines the fluid separation characteristics and can be less than 10 microns thick, preferably less than 5 microns thick, most preferably less than 1 micron thick. The average pore diameter in the surface layer can be below 50 nm, preferably below 25 nm, most preferably below 15 nm. Porous PAEK fluid separation membranes prepared by this method exhibit asymmetric pore structure that provides for a higher fluid permeability combined with high solute separation efficiency.

The mesoporous PAEK article can be further chemically modified with functional groups. The reaction conditions are selected to prevent substantial change to the pore size, pore volume or the degree of crystallinity to preserve PAEK material attributes. Thus, the functionalization is carried out on the pore surface. The PAEK materials can be modified with a broad range of functional groups including primary, secondary, tertiary or quaternary amine groups, carboxyl groups, sulfonic acid groups, phosphate groups, primary, secondary or tertiary hydroxyl groups, ethylene oxide groups and/or sulfhydryl groups. In one preferred method, the mesoporous PAEK article is functionalized via a chemical reaction of ketone groups in benzophenone segments of a polymeric backbone of the poly(aryl ether ketone) polymer. The ketone groups in the benzophenone segment of the polymer backbone can be reduced using reagents such as $NaBH_4$ or $LiAlH_4$ to form hydroxyl groups. The hydroxyl groups can be further reacted with functional organic molecules such as functional epoxide molecules.

In some embodiments of the invention, the mesoporous article contains a solid core. Articles composed of a mesoporous layer supported by interior solid core are desirable as a chromatographic or adsorbent media. In one embodiment the layered mesoporous article is formed by a method of: (a) forming a blend of a poly(aryl ether ketone) polymer with a polyimide; (b) forming a shaped article from the blend by melt processing, wherein the formed article is substantially amorphous; (c) subjecting the surface of the shaped article to a solvent treatment step that induces crystallization in the shaped article; (d) subjecting the shaped article to a thermal annealing step to complete crystallization; (e) removing the polyimide from the surface of the shaped article to a predetermined depth to form a mesoporous surface layer by bringing the shaped article into contact with a primary amine or hydrazine to affect decomposition of the polyimide; and (f) recovering the mesoporous poly (aryl ether ketone) article that contains the mesoporous surface layer and a solid core.

The mesoporous surface layer can be further functionalized via a chemical reaction of ketone groups in benzophenone segments of a polymeric backbone of the poly(aryl ether ketone) polymer. The preferred configuration of such mesoporous poly (aryl ether ketone) article is the form of a sphere, a monofilament, a film or a micro capillary. The diameter of the spherically shaped article, the monofilament or microcapillary can vary from mm size to 10 micron. The thickness of the exterior mesoporous surface layer can vary and in some embodiments is less than 10 micron. The layered mesoporous poly (aryl ether ketone) article containing the solid core is particularly useful as an adsorbent media, a chromatographic media, a catalyst or a porous support for solid state synthesis.

In another embodiment, the layered mesoporous article with a solid core is formed by a method comprised of the following steps: (a) coextruding a first poly(aryl ether ketone) polymer with a blend of a second poly(aryl ether ketone) polymer with a polyimide to form a shaped multilayer dense article, wherein the shaped article is substantially amorphous; (b) subjecting the shaped article to a treatment step to crystallize the first and the second poly(aryl ether ketone) polymers throughout the shaped article; (c) removing the polyimide from a layer of the shaped article, comprised of the blend of the second poly(aryl ether ketone) polymer with the polyimide, to form a mesoporous surface layer by bringing the shaped article into contact with a primary amine or hydrazine to affect decomposition and removal of the polyimide; and (d) recovering the mesoporous poly (aryl ether ketone) article that contains the mesoporous surface layer and a solid core. The crystallization can be carried out by contacting the shaped article with a solvent system capable of inducing poly (aryl ether ketone) polymer crystallization, by a high temperature annealing or by a sequence of solvent treatment followed by a thermal annealing. The PAEK polymers in each coextruded layer can be the same or different but, in all cases, consist of a poly (ether ketone), a poly (ether ether ketone), a poly (ether ketone ketone), a poly (ether ether ketone ketone) or a poly (ether ketone ether ketone ketone).

The mesoporous surface layer can be further functionalized via a chemical reaction of ketone groups in benzophenone segments of a polymeric backbone of the poly(aryl ether ketone) polymer. The preferred configuration of such mesoporous poly (aryl ether ketone) article is the form of a sphere, a monofilament, a film or a micro capillary. The diameter of the spherically shaped article, the monofilament or microcapillary can vary from mm size to 10 micron. The thickness of the exterior mesoporous surface layer can vary and in some embodiments is less than 10 micron. The layered mesoporous poly (aryl ether ketone) article containing the solid core is particularly useful as an adsorbent media, a chromatographic media, a catalyst or a porous support for solid state synthesis.

Figure 7A:
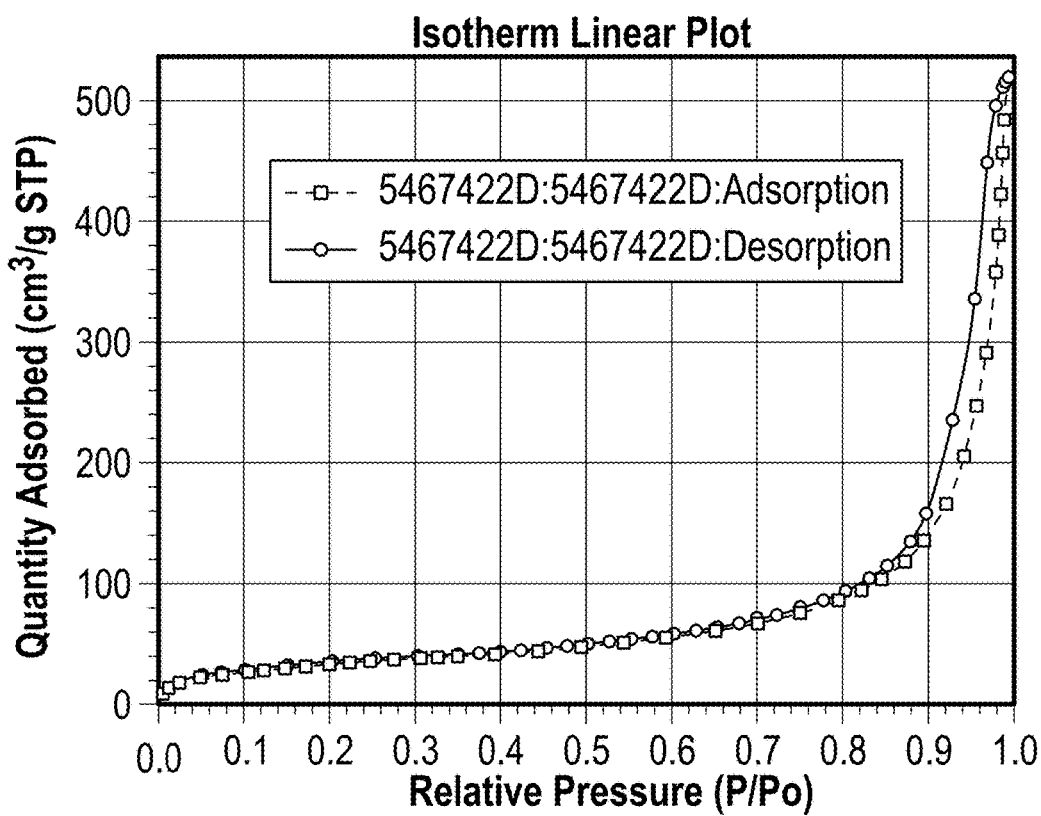
FIGS. 7A and 7B illustrate nitrogen adsorption BET analysis of mesoporous PEK beads prepared by the solvent induced crystallization with acetone followed by thermal annealing. Specifically.
Figure 7B:
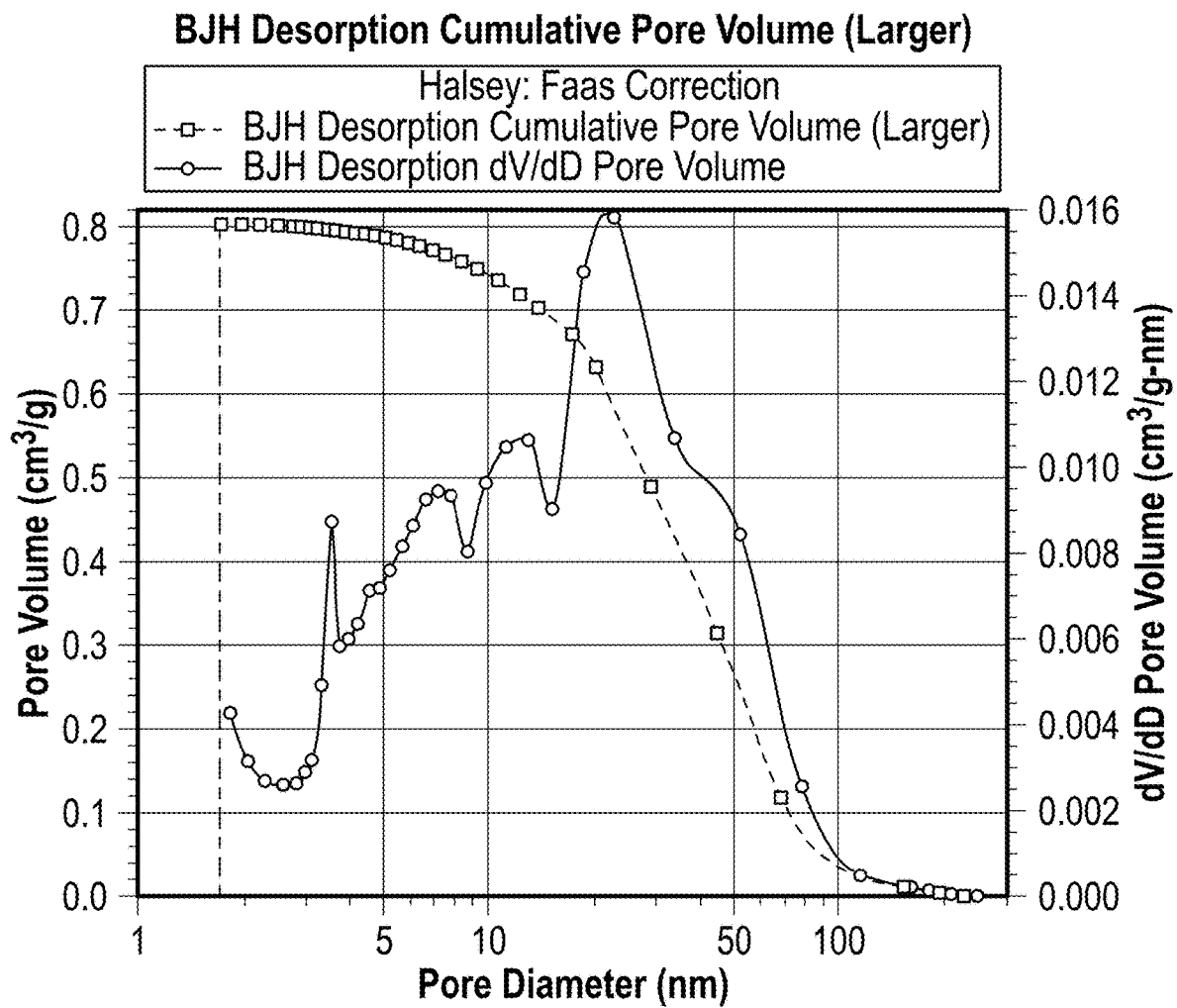
Figure 8:
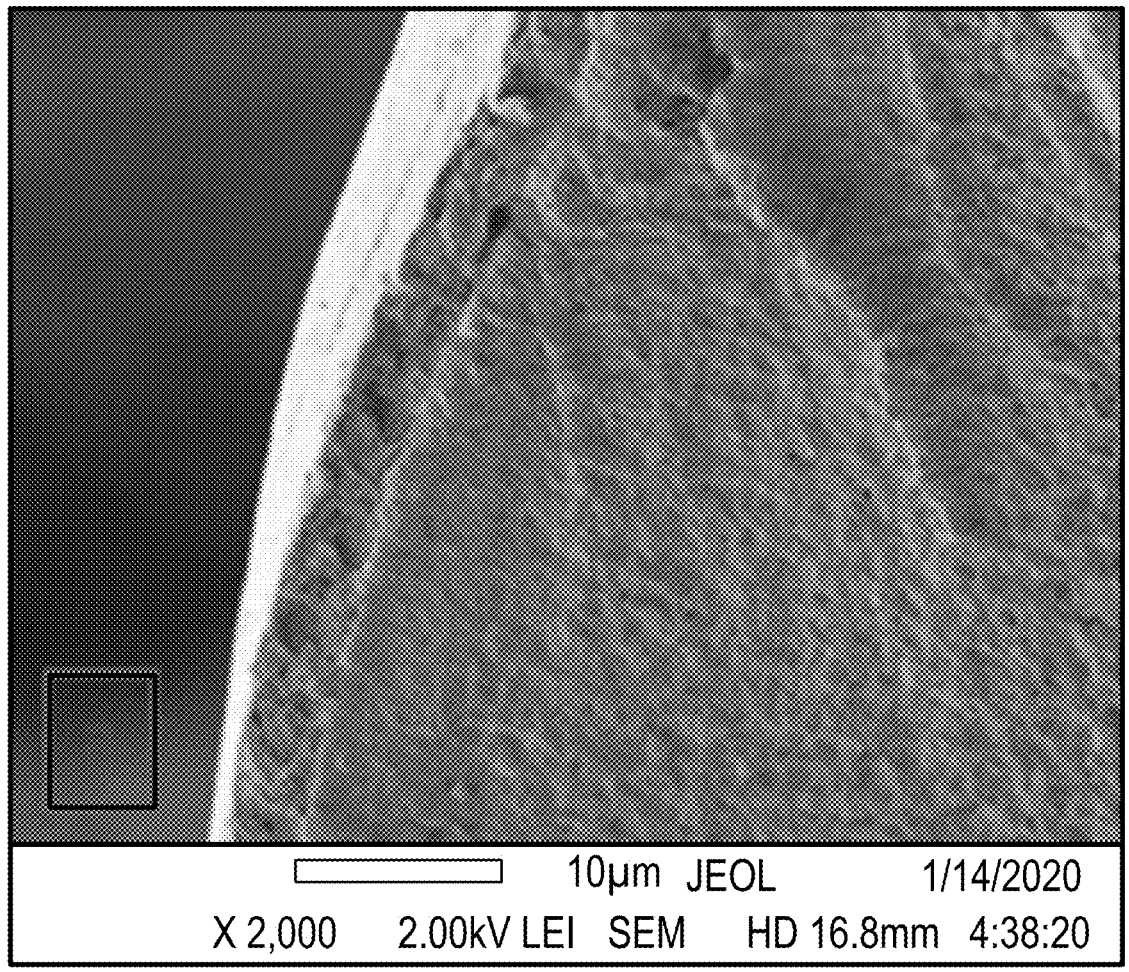
FIG. 8 illustrates a microphotograph of a hollow fiber cross section with a porous exterior surface layer and dense non-porous interior wall'

The mesoporous materials of this invention are characterized by a high surface area that can be as high as 180 $m^2$/g and above. Preferably the surface area is above 100 $m^2$/g, most preferably above 140 $m^2$/g. The PAEK materials were characterized by the nitrogen adoption BET method. Sorption isotherms and pore size distribution are represented in FIGS. 1 through 7. The multilayer structure of hollow fiber with a mesoporous surface layer and a solid interior layer is shown in FIG. 8.

The nascent non-porous precursor PAEK/polyimide article is preferably formed by melt processing, such as extrusion, compression molding, injection molding or 3D printing. The article can be in the form of a pellet, disc, flat sheet, film, fiber, tube, capillary or of a complex shape dictated by the intended final use of the porous article. The flat sheet, tubular and micro-capillary configurations, such as hollow fiber configuration, are preferred for fluid membrane separation applications. The poly (aryl ether ketone)/polyimide blends can be fabricated into hollow fibers by melt extrusion. The nascent hollow fiber is substantially amorphous. The hollow fiber preferably possesses an outside diameter from about 50 to about 1000 micrometers, more preferably from about 80 to about 500 micrometers, with a wall thickness from about 10 to about 100 micrometers. Prior to polyimide phase removal, the hollow fiber is subjected to the surface solvent treatment that is followed by annealing. The solvent treatment can be alternatively carried out on the bore side or the shell side of the hollow fiber. In some embodiments, both interior and exterior surfaces of the hollow fiber are treated simultaneously. Following the completion of the desired surface layer treatment, the residual solvent is removed and the hollow fiber is subjected to the thermal annealing. The polyimide material is decomposed and decomposition products removed by washing to form an asymmetric hollow fiber. The solvent treatment process conditions, such as temperature and treatment's duration time, are selected to provide for a thin surface layer with smaller diameter size pores. The solvent treatment is typically carried out at room temperature and up to the boiling point of the solvent. Treatments at lower temperatures from between 20° C. and 120° C. are preferred. The treatment time can be a minute or less to several hours depending on the desired depth of the treatment.

It is advantageous to structure the hollow fiber wall as a layered structure with distinct regions of variable average pore size and/or pore volume and, in particular, to form hollow fiber membranes utilizing an asymmetric porous wall structure to increase solute transfer rate. One method of forming high solute transfer rate PAEK hollow fibers in addition to deploying the surface layer solvent treatment process is by forming a multi-layer porous wall structure with a small mesoporous pore size exterior layer and a larger pore size macro-porous interior wall layer. Multi-layer hollow fibers are formed by coextruding PAEK/pore forming additive blend compositions that differ in pore forming additives composition and/or additive weight fraction. The method provides for the preparation of hollow fibers with 2 to 10, preferably 2 to 4, distinct porous wall layers of variable average pore size. In one embodiment, the hollow fiber porous wall structure consists of two layers with the exterior layer exhibiting an average pore diameter below 50 nanometers, preferably between 10 and 30 nanometers, and the interior wall layer exhibiting an average pore diameter above 0.1 micron.

In one example, a hollow fiber with a multilayer wall structure is formed by coextrusion of two PEEK/PEI blends of different blend composition. The surface of the hollow fiber is subjected to solvent treatment followed by annealing. After PEI pore forming material is removed, a hollow fiber with mesoporous surface layer and a porous wall with two layers of a distinct pore size and pore volume is formed. This wall pore structure provides for a reduced resistance to solute transfer. It is also within the scope of the present invention to form multilayer hollow fiber with multiple zones that differ in pore size. The multi-zone porous hollow fiber that contains porous zones that differ by at least about 10% in the average pore size or by at least about 5% in the pore volume impart certain advantages to mechanical or functional characteristics to the hollow fiber. For example, the multi-zone porous hollow fiber can provide improved mechanical properties while increasing solute transfer rate. The multi-zone porous hollow fiber formed from two or more PEEK/porogen blends can contain different PEEK porogen components or differ in the PEEK/porogen ratio. The PEEK polymer content of the first blend can differ from the PEEK polymer content of the second blend and any additional blends by between 5 to 50 weight percent, preferably by at least 10 to 25 weight percent. The blend composition of individual layers can further differ in the PAEK polymer composition. For example, PEEK can be used as wall forming material in one layer while PEK or PEKK can be used as wall forming material in an adjacent layer.

The multilayer hollow fiber of the desired dimensions and configuration can contain two, three or more contiguous layers that differ in the average pore size and/or pore volume. Furthermore, the individual layer can vary from about 5% of the overall hollow fiber wall thickness to 50% of the overall wall thickness. The thickness of each layer can be controlled and can be as thin as 10 micrometers or less.

It is known in the art that melt processing conditions can affect crystalline morphology. A change in crystalline morphology of the PAEK/polyimide precursor will, in turn, affect pore morphology following polyimide phase removal. A high draw down ratio during the article's extrusion will induce polymer chain orientation. The chain orientation can lead to change in crystalline morphology. The morphology can transition from a spherulitic to a shish-kebab crystalline structure. Forming films, monofilament and hollow fibers under a high draw ratio extrusion condition leads to the high polymer chain orientation in the article and is preferred. Preferably, the article is formed at a draw ratio above 5, most preferably above 10. Polymer chain orientation tends to be preserved during the solvent crystallization process and thus leads to the formation of shish-kebab crystalline morphology. This in turn leads to the formation of small uniform size pores. The solvent treatment process is thus distinct from the thermal annealing. Thermal annealing is carried out at high temperatures and is accompanied by high chain mobility leading to loss of chain orientation and alignment. Thus, articles crystallized by the thermal annealing process tend to exhibit spherulitic crystalline morphology. This, in turn, leads to a broader and less uniform pore size distribution in the final porous article.

The solvent treatment of the amorphous article formed by melt processing provides a further benefit, as it stabilizes the surface of the shaped article against distortion. Absent solvent treatment, the high temperature annealing required to fully crystallize the PAEK polymer can lead to a distortion of the article's shape or even to a complete melting of the article.

The pore size of the PAEK article is further affected by the PAEK/polyimide ratio. High concentration of polyimide fraction in the blend provides for a larger average pore diameter. Blends suitable for preparation of porous articles in accordance with this invention comprise from about 20 to about 60 weight percent of the poly (aryl ether ketone) polymer component, preferably from about 25 to about 50 weight percent of the poly (aryl ether ketone) component, most preferably from 35 to 50 weight percent of the poly (aryl ether ketone) component.

The removal of the polyimide component from the blend can be effectively carried out by the reactive porogen removal process, RPR, utilizing reagents that decompose the polyimide into low molecular weight easily extractable fragments. The suitable classes of reagents include, but are not limited to, ammonia, tetraalkylammonium hydroxides, hydrazine, alkylhydrazines, hydroxyalkylhydrazine, primary aliphatic amines, or secondary aliphatic amines. In some embodiments, the reagent that affects polyimide decomposition is diluted with a solvent and/or contains water. Examples of suitable solvents include alcohols, ketones, hydrocarbons, water, and aprotic solvents such as NMP, DMF, and the like. Amine reagents suitable to decompose the polyimide phase in accordance with this invention include, but are not limited to, primary and secondary amines, such as methylamine, ethylamine, propylamine, butylamine, ethylenediamine, propylenediamine, butylenediamine, morpholine, piperazine, monoethanolamine, ethylethanolamine, diethanolamine, propanolamine, dipropanolamine, and mixtures thereof. Commercially available amine mixtures, such as Ucarsol®, can be also employed. The preferred amines include hydrazine, monoethanolamine, tetramethylammonium hydroxide, and their mixtures with alcohols, such as methanol, ethanol, isopropanol, or butanol, ketones, water, and aprotic solvents. The most preferred reagents for the decomposition of the polyimide phase are the monoethanolamine, MEA, hydrazine and the tetramethylammonium hydroxide.

The decomposition and removal of the polyimide component can be carried out at an ambient temperature, but preferably is carried out at elevated temperatures to facilitate the decomposition process and the removal of decomposition products. Preferably, the polyimide decomposition process and the removal of the low molecular weight decomposition product are carried out concurrently in a common solvent media. The comprehensive removal of decomposition products may require additional washing. In one embodiment of this invention, the polyimide decomposition and removal process is carried out in a neat MEA solvent at a temperature from about 50° C. to about 180° C., preferably from about 80° C. to 150° C. The time required to fully decompose polyimide and to remove products of the decomposition process from the hollow fiber will depend on the fiber dimensions and crystalline morphology, the amount of PEI fraction and the thickness of article's wall as well as process conditions, including reagent concentration, agitation rate, temperature and the like, as will be recognized by those skilled in the art. The thus formed porous poly (aryl ether ketone) article is then washed with an alcohol, water, or other suitable solvent and dried.

In some embodiments of this invention, it is desirable to form an article with a porous surface and a dense non-porous interior. To form a porous surface layer, the etching RPR process is terminated before the entire body of the article is converted to the porous structure. The RPR process proceeds from the surface of the article to the interior and is diffusion controlled. The rate is controlled by the reagent concentration and reaction temperature. The time of the treatment can be limited to affect pore formation to a desired surface depth only. In one such example, the article in the form of a micro capillary is treated with a solvent on the bore side only; the treatment is followed by thermal annealing to complete crystallization throughout the wall of the micro capillary; the bore side of the micro capillary is treated with monoethanolamine for a short time period to remove the polyimide from the surface only. The controlled surface etching can provide porous surfaces that are 5 micron thick or less, and in some embodiments the porous layer thickness is less than 1 micron.

A range of solvents can be used to affect solvent treatment of precursor PAEK/porogen blend articles. To induce crystallization, the solvent must sorb into the article to a degree sufficient to induce chain mobility. It was found surprisingly that a low degree of sorption is sufficient to induce chain mobility in articles formed from PAEK/polyetherimide blends. Solvents of an intermediate strength can generate sufficient swelling of the article to affect crystallization at room temperature conditions. An increase in temperature may be required to affect crystallization when a mild solvent is used. For example, acetone can induce crystallization at temperatures above 50° C. but is not effective at room temperature conditions. Low boiling point can limit the temperature range for a given solvent use. High boiling point provides for an expanded range of treatment temperatures. Solvent diffusion rate increases with increase in temperature and accelerates penetration into the article's interior. However, treatment at high temperature, particularly close to the glass transition temperature of the material, generates high chain mobility that can lead to loss of beneficial morphology afforded by the solvent treatment.

It was found surprisingly that the pore size of the article can be controlled by solvent selection and treatment temperature. Mesoporous materials with different average pore diameter can be prepared from the precursor of the same PEEK/polyetherimide blend composition by a change in solvent selection and treatment temperature. Mild solvents at low temperatures are generally preferred but may lead to the formation of proto crystals and a low overall degree of crystallinity. To attain the desired high degree of crystallinity the material must be further subjected to the thermal annealing step. Proto crystals serve as seeds and provide desired morphology of high degree of crystallinity combined with small crystal size in the final annealed article which, in turn, provides for small average pore size in the final porous article.

A range of solvents can be adopted to carry out the method of the present invention. Nanoporous PAEK materials can be formed wherein the solvent treatment is carried in an alcohol, a ketone, a chlorinated hydrocarbon, an aromatic hydrocarbon or a mixture thereof. Low toxicity environmentally benign solvents are preferred. Examples of alcohols include butanol, ethylene glycol, propylene glycol, isobutyl alcohol, tert-amyl alcohol, cetyl alcohol, pentanol, cyclohexanol or glycerol to name a few. Examples of ketones include acetone, methyl ethyl ketone (butanone), 2-hexanone, isophorone, methyl isobutyl ketone, cyclopentanone, acetophenone, valerophenone or pentanone to name a few. The use of chlorinated and aromatic hydrocarbons is less preferred due to toxicity and environmental considerations.

The present invention is described below by examples, which should not be construed as limiting the present invention.

EXAMPLES

Example 1

Figure 1B:
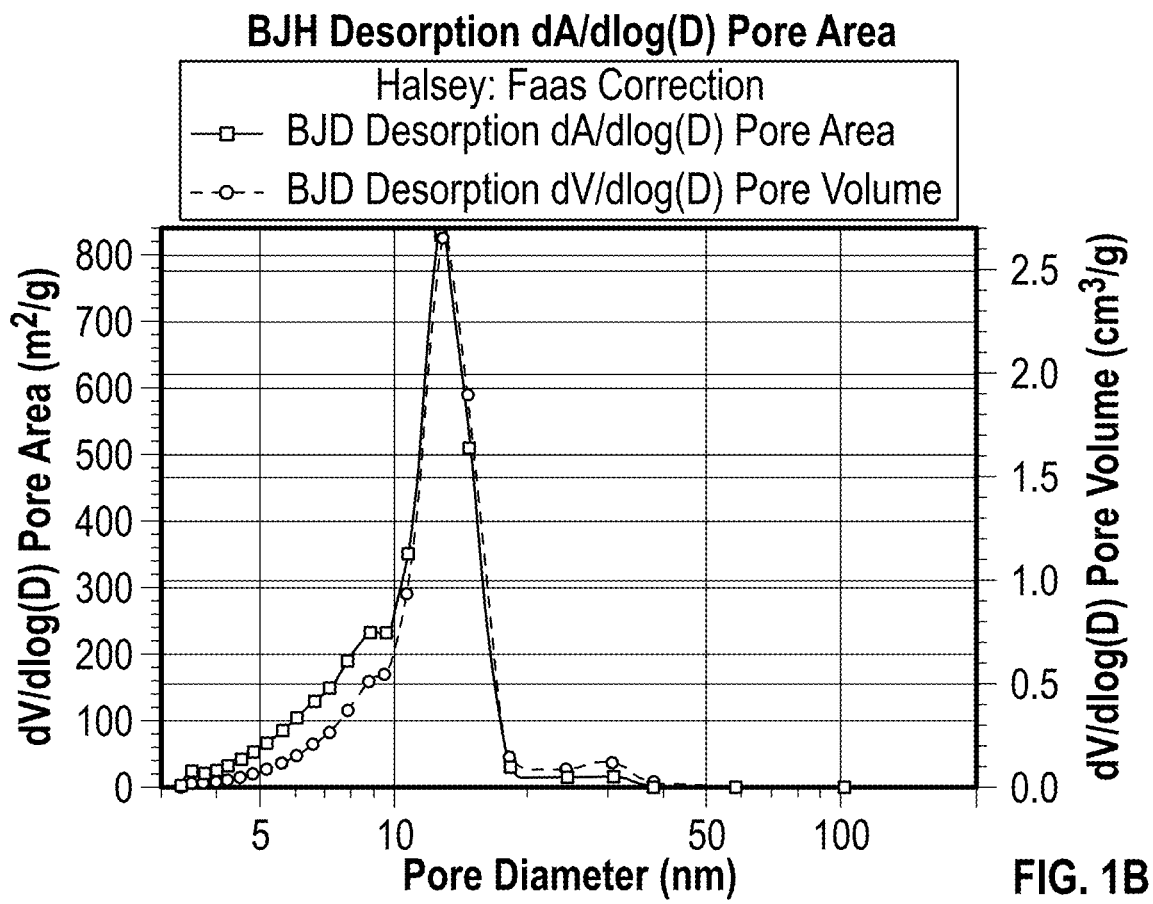

This example describes preparation of mesoporous PEEK hollow fibers utilizing solvent treatment with acetone. Poly (ether ether ketone) and polyetherimide, PEEK/PEI, blend (PEEK, Victrex 381G and PEI Ultem 1000; 50:50 ratio by weight) was compounded in a twin extruder. A precursor non-porous hollow fiber was prepared by melt extrusion at circa 380° C. and quenched in water. The hollow fiber dimensions were 500 micron outside diameter and 400 micron inside diameter. Precursor hollow fibers were immersed into acetone and maintained at reflux temperature for 24 hours. Following solvent treatment hollow fibers were washed with water, dried and heat treated at 300° C. for 0.5 hour. Hollow fibers were subjected to the RPR process by immersing fibers into solution of NMP/monoethanolamine/water 80/10/10 by volume at 80° C. for 24 hours. The reservoir containing the solution was blanketed with nitrogen. The thus formed porous PEEK hollow fibers were washed extensively with distilled water, fresh isopropyl alcohol and dried. Gravimetric analysis indicated substantially complete removal of the polyetherimide. The porous structure of the hollow fiber was evaluated by nitrogen adsorption BET. The adsorption and desorption isotherms are shown in FIG. 1A as well as pore size distribution in FIG. 1B. The BET surface area was 142.9 m$^2$/g, pore volume 0.57 cm$^3$/g and the measured average pore diameter was 11.7 nm. The nitrogen adsorption isotherms and pore size distribution are shown in FIGS. 1A and 1B.

Example 2

Figure 2A:
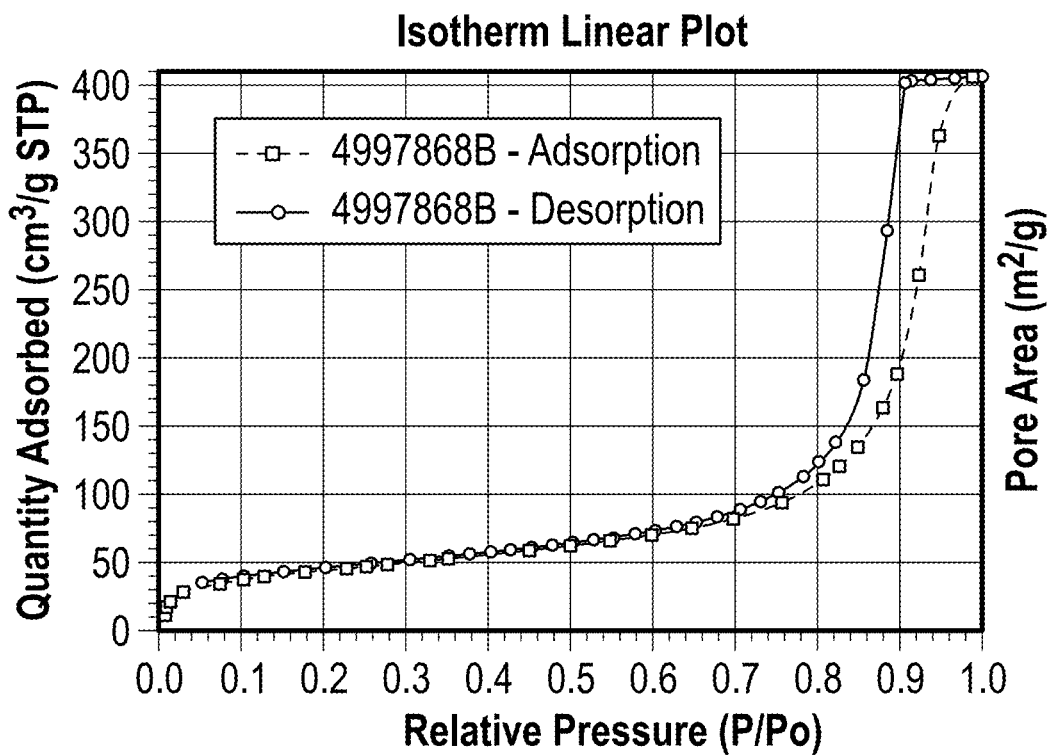
FIGS. 2A and 2B illustrate a nitrogen adsorption BET analysis of mesoporous PEEK hollow fibers prepared by the solvent induced crystallization with butanol. Specifically.
Figure 2B:
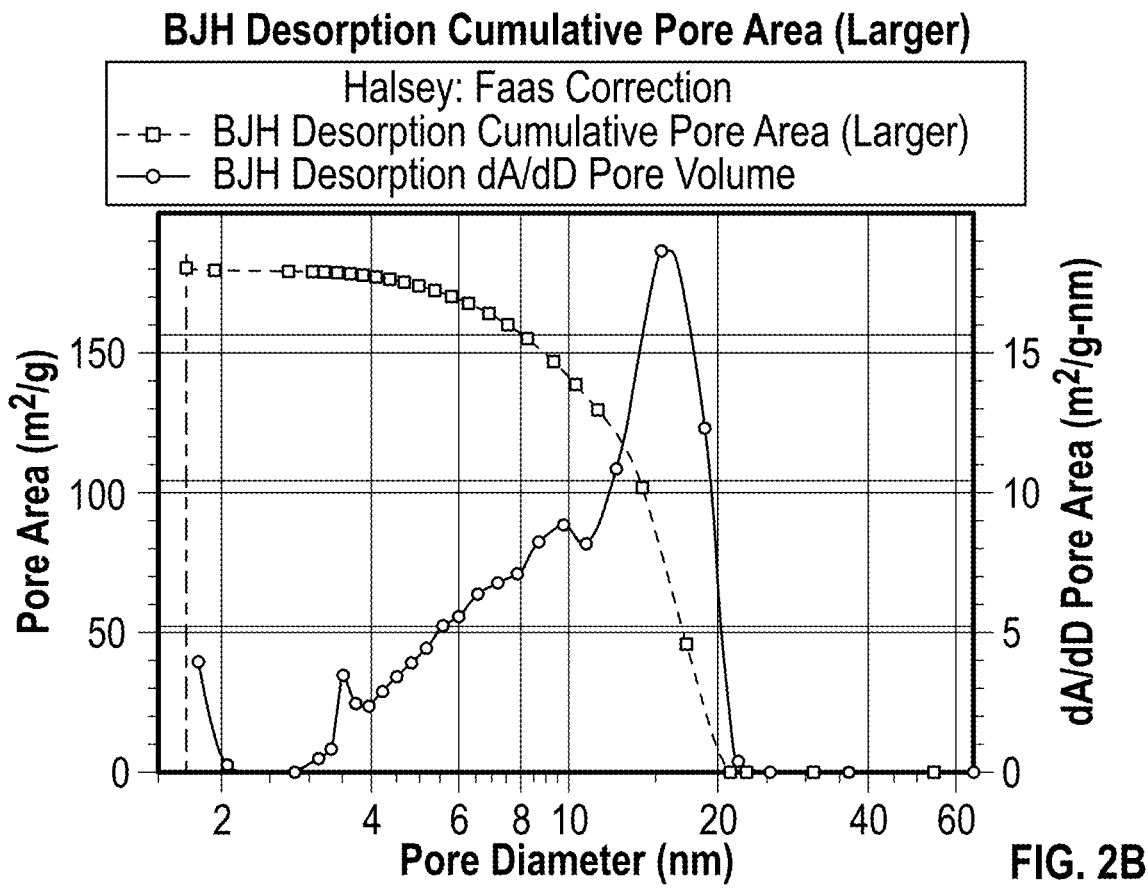

This example describes preparation of mesoporous PEEK hollow fibers utilizing solvent treatment with butanol. Poly (ether ether ketone) and polyetherimide, PEEK/PEI, blend (PEEK, Victrex 381G and PEI Ultem 1000; ratio 50:50 by weight) was compounded in a twin extruder. A precursor non-porous hollow fiber was prepared by melt extrusion at circa 380° C. and quenched in water. The hollow fiber dimensions were 500 micron outside diameter and 400 micron inside diameter. Precursor hollow fibers were immersed into butanol and maintained at 100° C. temperature for 24 hours. Following solvent treatment hollow fibers were washed with water, dried and heat treated at 300° C. for 0.5 hour. Hollow fibers were subjected to the RPR process by immersing fibers into solution of NMP/monoethanolamine/water 80/10/10 by volume at 80° C. for 24 hours. The reservoir containing the solution was blanketed with nitrogen. The thus formed porous PEEK hollow fibers were washed extensively with distilled water, fresh isopropyl alcohol and dried. Gravimetric analysis indicated substantially complete removal of the polyetherimide. The porous structure of hollow fibers was evaluated by nitrogen adsorption BET. The adsorption and desorption isotherms are shown in FIG. 2A as well as pore size distribution in FIG. 2B. The BET surface area was 154.6 m$^2$/g, pore volume 0.63 cm$^3$/g and the measured average pore diameter was 13.8 nm. The nitrogen adsorption isotherms and pore size distribution are shown in FIGS. 2A and 2B.

Example 3

This example describes preparation of mesoporous PEEK material in a pellet format utilizing solvent treatment with acetone. Poly (ether ether ketone) and polyetherimide, PEEK/PEI, blend (PEEK, Victrex 381G and PEI Ultem 1000; 35:65 ratio by weight) was compounded in a twin extruder and pelletized. Precursor non-porous pellets were immersed into acetone and maintained at reflux temperature for 24 hours. Following solvent treatment pellets were washed with water, dried and heat treated at 300° C. for 0.5 hour. Pellets were subjected to the RPR process by immersing into solution of NMP/monoethanolamine/water 80/10/10 by volume at 80° C. for 24 hours. The reservoir containing the solution was blanketed with nitrogen. The thus formed porous PEEK pellets were washed extensively with distilled water, fresh isopropyl alcohol and dried. Gravimetric analysis indicated substantially complete removal of the polyetherimide. The porous structure of porous pellets was evaluated by mercury intrusion porosimetry, MIP. The MIP surface area was 148 m$^2$/g, porosity 76% and the average pore diameter was 80 nm.

Example 4

This example describes preparation of mesoporous PEEK hollow fibers with layered porous structure. Poly (ether ether ketone) and polyetherimide, PEEK/PEI, blend (PEEK, Victrex 381G and PEI Ultem 1000; ratio 50:50 by weight) was compounded in a twin extruder. A precursor non-porous hollow fiber was prepared by melt extrusion at circa 380° C. and quenched in water. The hollow fiber dimensions were 500 micron outside diameter and 400 micron inside diameter. Precursor hollow fibers were immersed into butanol and maintained at 100° C. temperature for 20 minutes. Care was taken to contact only the exterior of hollow fibers with the solvent. Following solvent treatment hollow fibers were quenched with water, dried and heat treated at 300° C. for 0.5 hour. Hollow fibers were subjected to the RPR process by immersing fibers into solution of NMP/monoethanolamine/water 80/10/10 by volume at 80° C. for 24 hours. The reservoir containing the solution was blanketed with nitrogen. The thus formed porous PEEK hollow fibers were washed extensively with distilled water, fresh isopropyl alcohol and dried. Gravimetric analysis indicated substantially complete removal of the polyetherimide. The bulk porous structure of hollow fibers was evaluated by nitrogen adsorption BET. The BET surface area was 141.6 m$^2$/g, pore volume 0.54 cm$^3$/g and the measured average pore diameter was 34.8 nm. Atomic force microscopy was used to evaluate the surface porosity of the hollow fiber. The average surface pore diameter as measured by AFM was circa 14 nm. The surface pore size was significantly smaller as compared to the interior bulk pore size.

Example 5

Figure 3A:
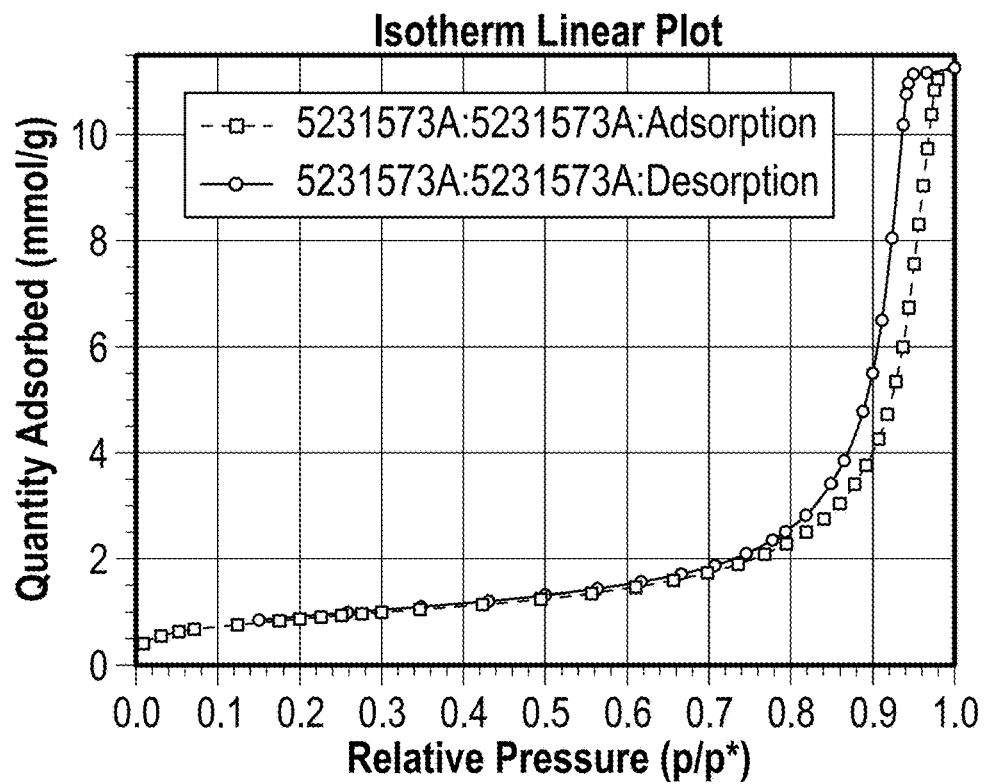
FIGS. 3A and 3B illustrate nitrogen adsorption BET analysis of mesoporous PEEK beads prepared by the solvent induced crystallization with acetone followed by thermal annealing. Specifically.
Figure 3B:
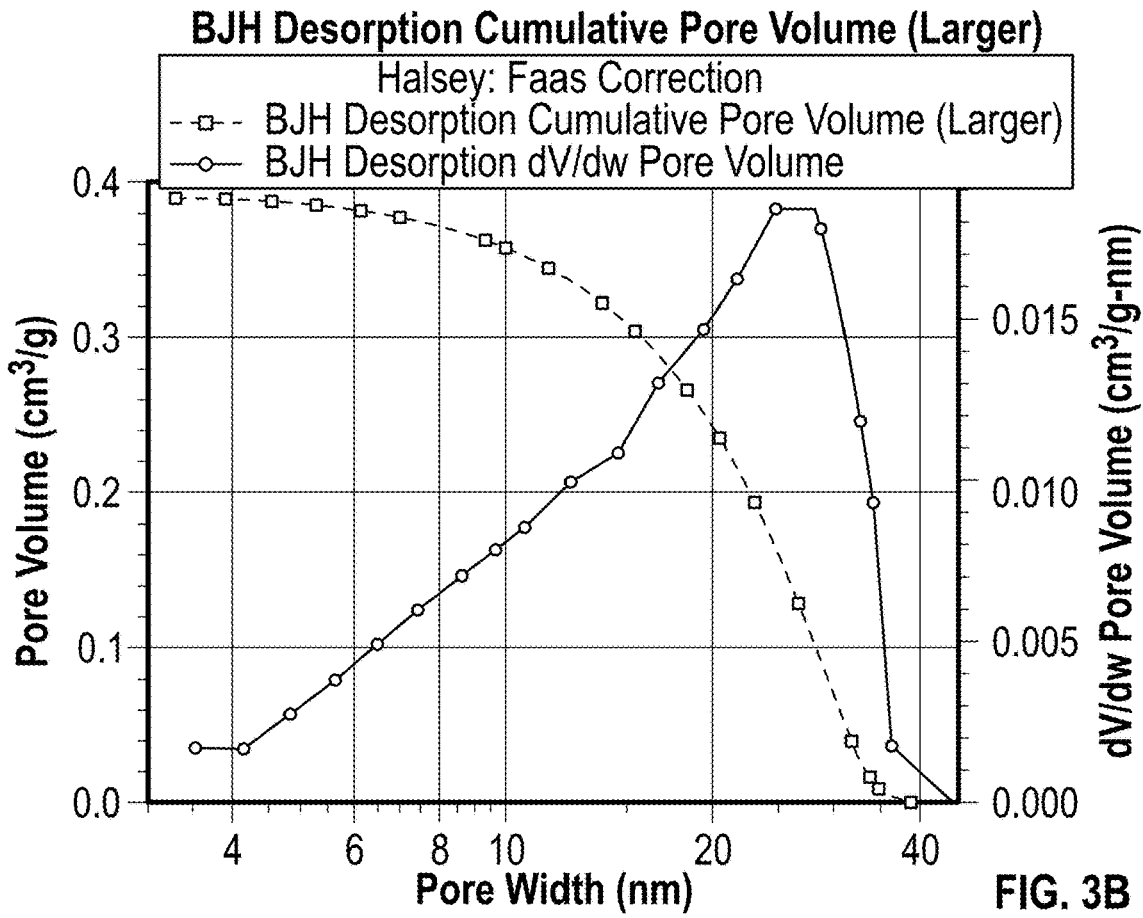

This example describes preparation of mesoporous PEEK material in a pellet utilizing solvent treatment with acetone. Poly (ether ether ketone) and polyetherimide, PEEK/PEI, blend (PEEK, Victrex 381G and PEI Ultem 1000; 50:50 ratio by weight) was compounded in a twin extruder and pelletized. Precursor non-porous pellets were immersed into acetone and maintained at reflux temperature for 24 hours. Following solvent treatment pellets were washed with water, dried and heat treated at 300° C. for 0.5 hour. Pellets were subjected to the RPR process by immersing into solution of NMP/monoethanolamine/water 80/10/10 by volume at 80° C. for 24 hours. The reservoir containing the solution was blanketed with nitrogen. The thus formed porous PEEK pellets were washed extensively with distilled water, fresh isopropyl alcohol and dried. Gravimetric analysis indicated substantially complete removal of the polyetherimide. The porous structure of porous pellets was evaluated by nitrogen adsorption BET. The surface area was 92 m$^2$/g, porosity 45% and the median pore diameter was 18 nm. The nitrogen adsorption isotherms and pore size distribution are shown in FIGS. 3A and 3B, respectively.

Example 6

Figure 4A:
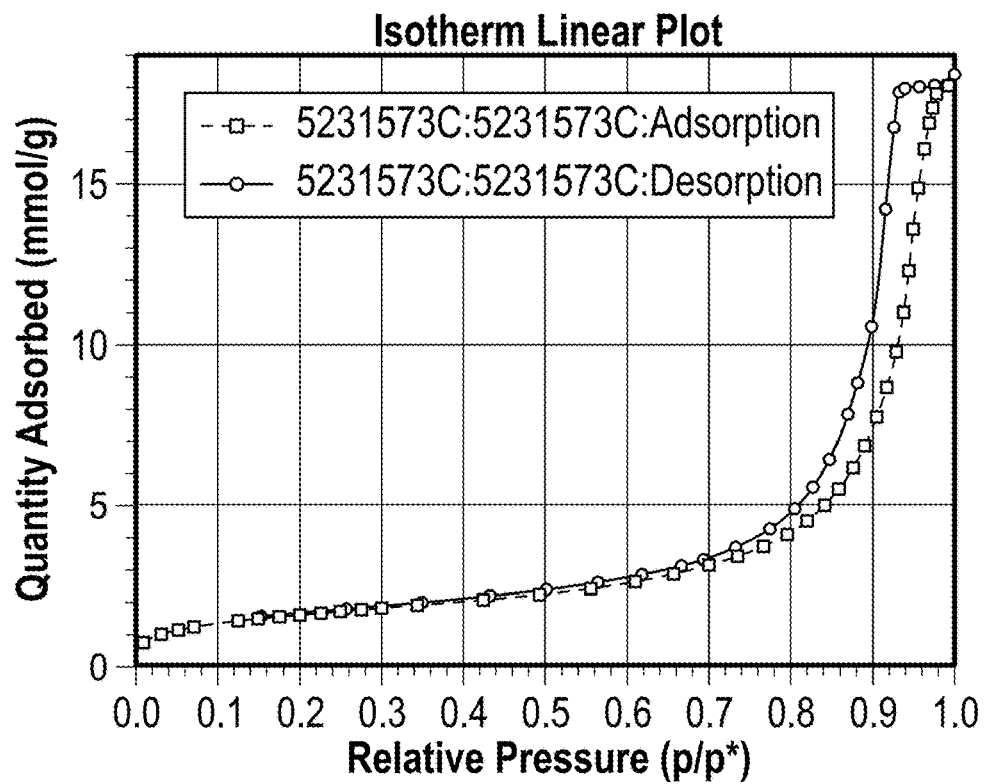
FIGS. 4A and 4B illustrate nitrogen adsorption BET analysis of mesoporous PEEK hollow fiber prepared by the solvent induced crystallization with acetone followed by thermal annealing. Specifically.
Figure 4B:
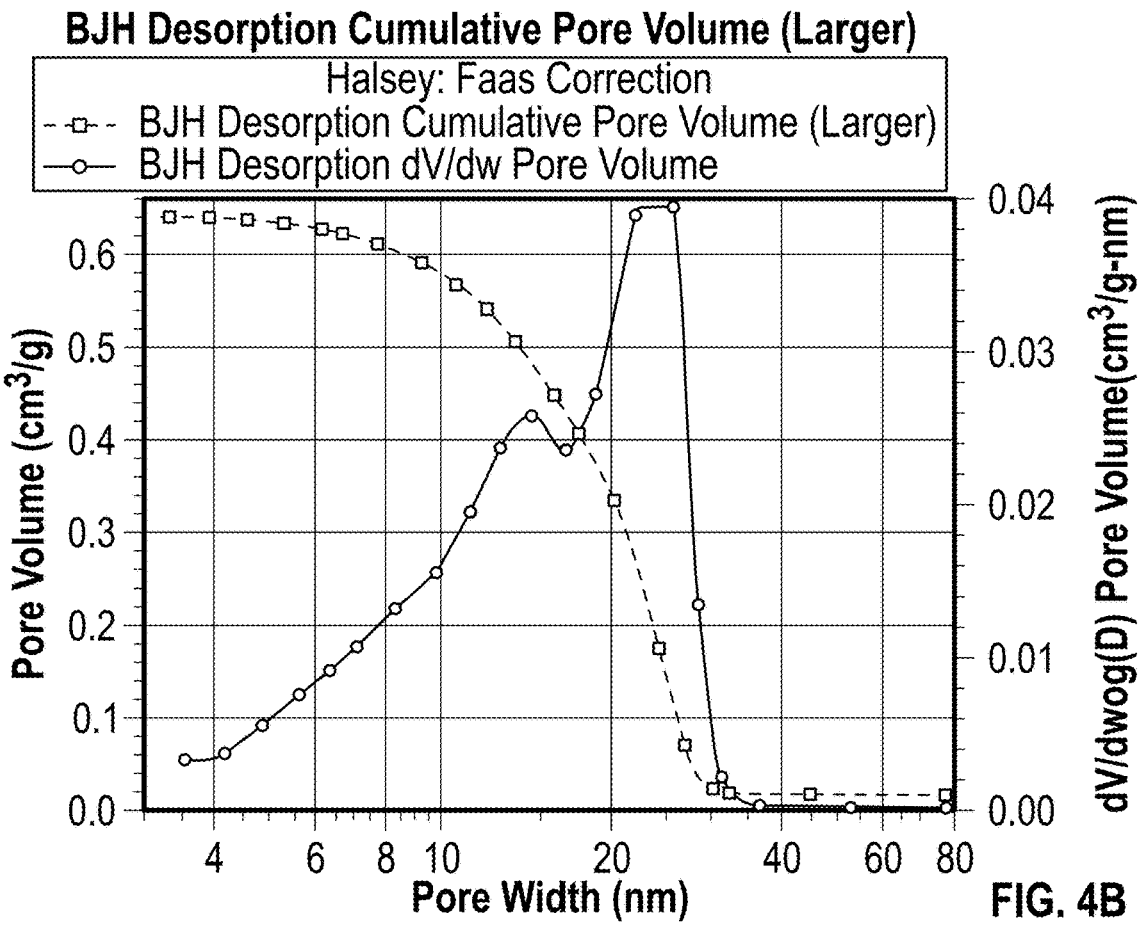

This example describes preparation of mesoporous PEEK material in a hollow fiber form. Poly (ether ether ketone) and polyetherimide, PEEK/PEI, blend (PEEK, Victrex 381G and PEI Ultem 1000; ratio 50:50 by weight) was compounded in a twin extruder. A precursor non-porous hollow fiber was prepared by melt extrusion at circa 380° C. and quenched in water. The hollow fiber dimensions were 550 micron outside diameter and 450 micron inside diameter. The hollow fiber was extruded at a different draw ratio as the hollow fiber in Example 4. Precursor hollow fibers were immersed into acetone and maintained at reflux temperature for 1 hour. Care was taken to contact only the exterior of hollow fibers with the solvent. Following solvent treatment, hollow fibers were quenched with water, dried and heat treated at 300° C. for 0.5 hour. Hollow fibers were subjected to the RPR process by immersing fibers into solution of NMP/monoethanolamine/water 80/10/10 by volume at 80° C. for 24 hours. The reservoir containing the solution was blanketed with nitrogen. The thus formed porous PEEK hollow fibers were washed extensively with distilled water, fresh isopropyl alcohol and dried. Gravimetric analysis indicated substantially complete removal of the polyetherimide. The bulk porous structure of hollow fibers was evaluated by nitrogen adsorption BET. The BET surface area was 129 $m^2/g$, pore volume 0.64 $cm^3/g$ and the measured average pore diameter was 16.3 nm. The nitrogen adsorption isotherms and pore size distribution are shown in FIGS. 4A and 4B, respectively.

Example 7

Figure 5A:
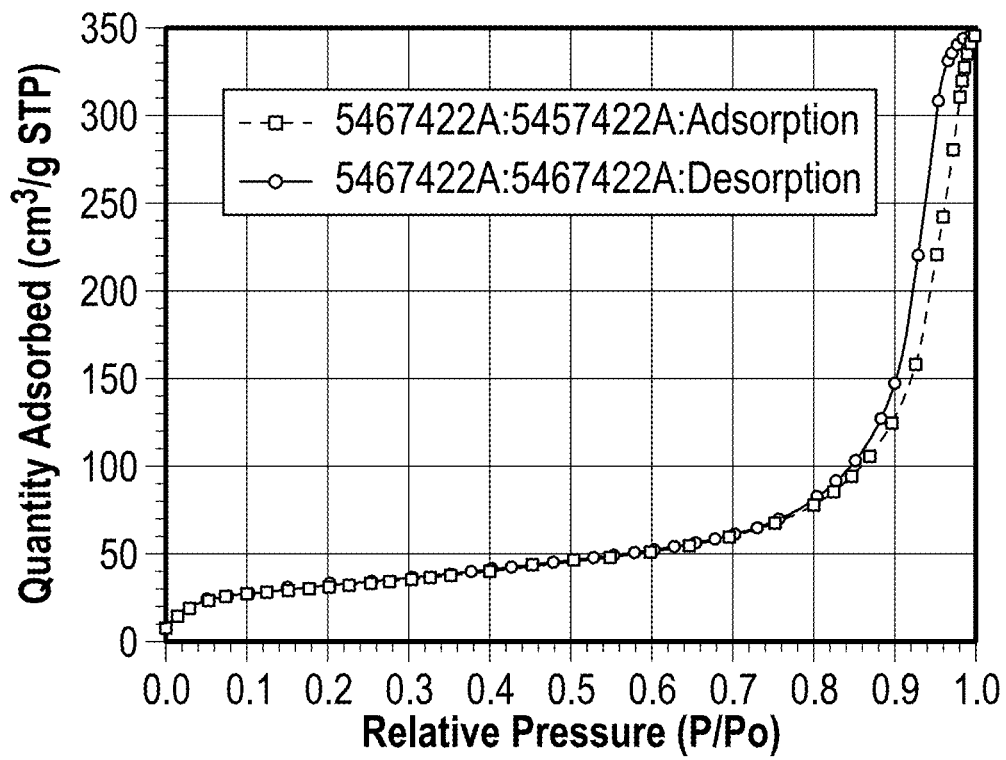
FIGS. 5A and 5B illustrate nitrogen adsorption BET analysis of mesoporous PEEK hollow fiber functionalized with hydroxyl groups (PEEK-OH), where the precursor hollow fiber was prepared by the solvent induced crystallization with acetone followed by thermal annealing. Specifically.
Figure 5B:
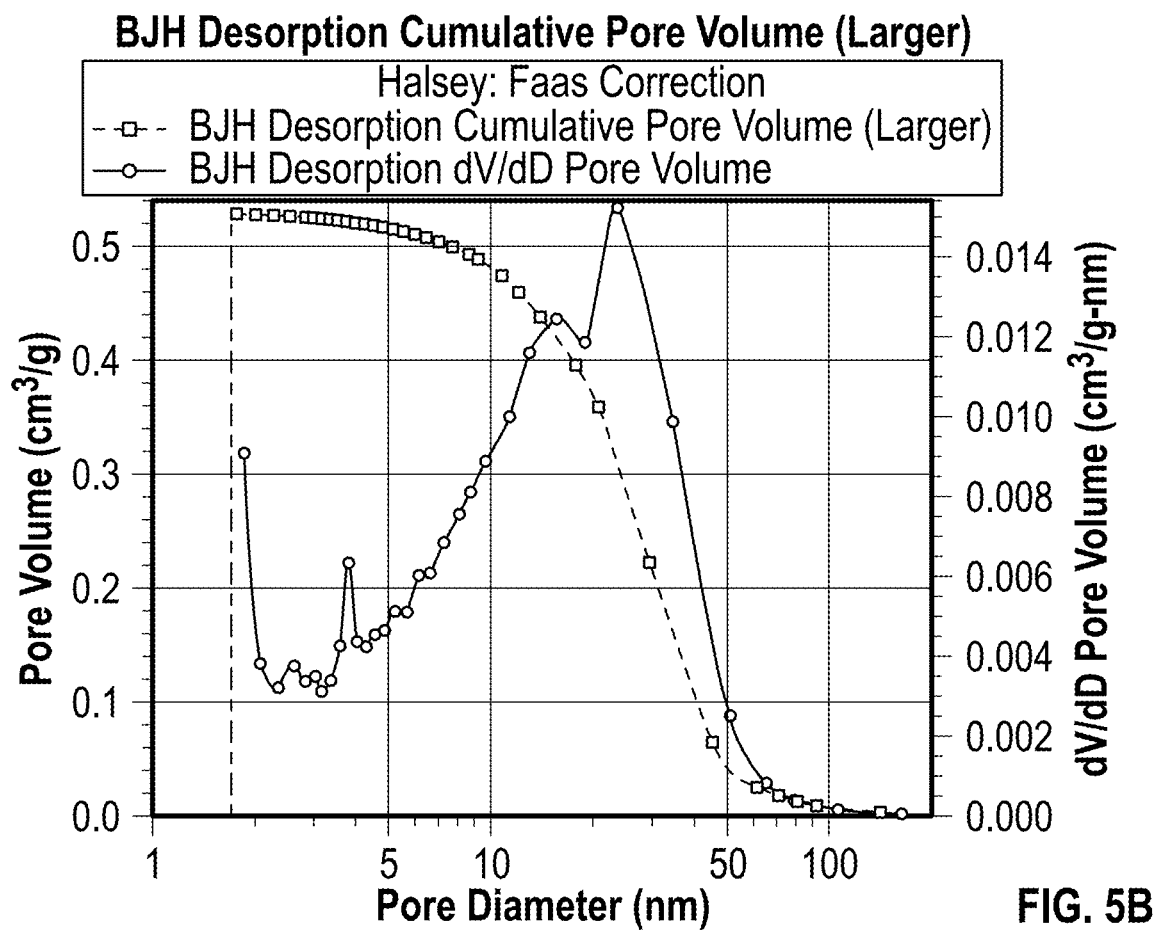
Figure 6:
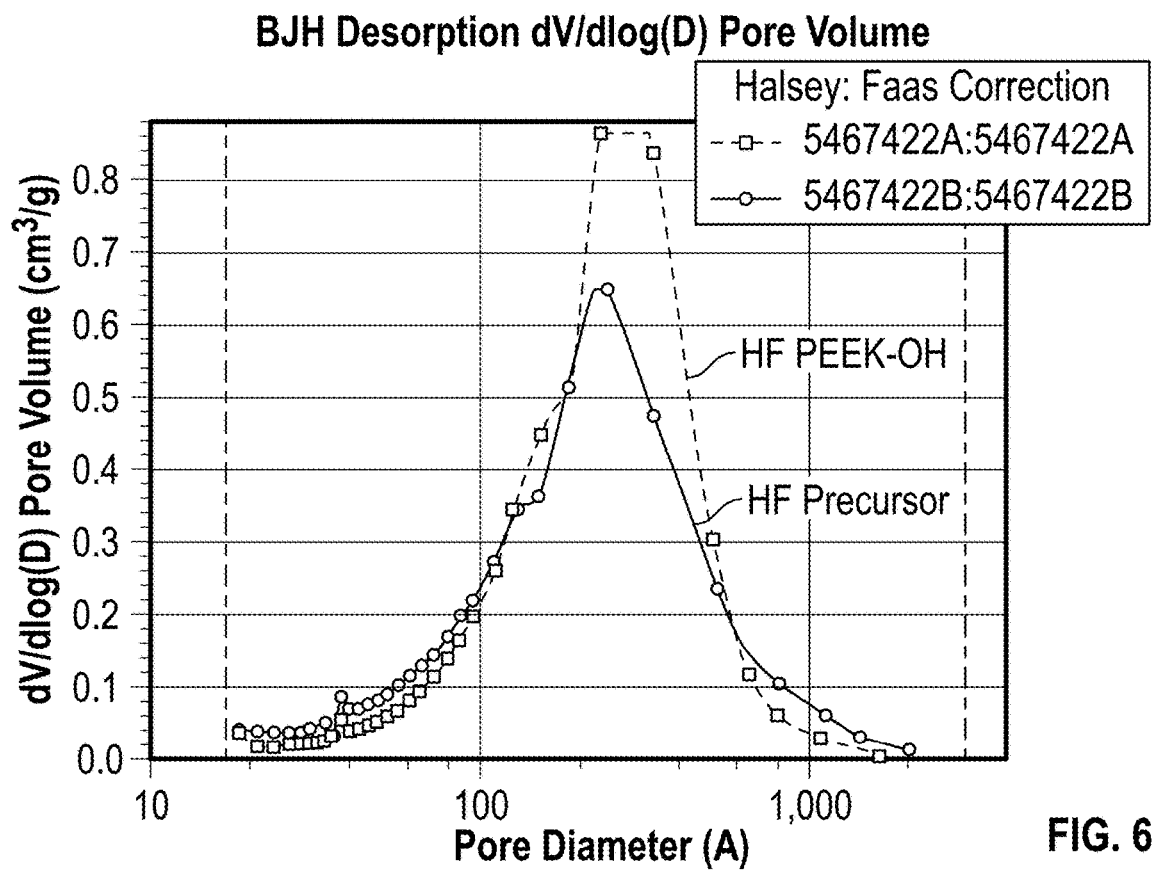
FIG. 6 illustrates a nitrogen desorption isotherm for mesoporous PEEK hollow fiber and functionalized PEEK-OH hollow fiber.

The mesoporous hollow fiber prepared as described in Example 6 was subjected to surface functionalization with hydroxyl groups. The pre-dried hollow fiber was treated with 1.0% w/v sodium borohydride solution in THF/PEG (1:1 ratio) for 4 hours while maintaining the solution at 50° C. The hollow fiber was then washed sequentially with dilute HCl solution (0.1N) and distilled water and then dried under nitrogen at 80° C. to a constant weight. The degree of substitution of PEEK-OH with hydroxyl groups was measured as 0.8 mmol/g. The bulk porous structure of hollow fibers was evaluated by nitrogen adsorption BET. The BET surface area was 116 $m^2/g$, pore volume 0.51 $cm^3/g$ and the measured average pore diameter was 18.5 nm. The nitrogen adsorption isotherms and pore size distribution are shown in FIGS. 5A and 5B, respectively. The pore size distribution of PEEK-OH material was compared to that of the precursor. The pore size distribution of PEEK-OH and the original mesoporous PEEK are shown in FIG. 6. There was no substantial alteration of pore size distribution following surface functionalization with —OH groups.

Example 8

This example describes preparation of a PEEK article in the hollow fiber form that contains a solid interior and a mesoporous surface layer. Poly (ether ether ketone) and polyetherimide, PEEK/PEI, blend (PEEK, Victrex 381G and PEI Ultem 1000; ratio 50:50 by weight) was compounded in a twin extruder. A precursor non-porous hollow fiber was prepared by melt extrusion at circa 380° C. and quenched in water essentially as described in Example 6. The hollow fiber dimensions were 550 micron outside diameter and 450 micron inside diameter. Precursor hollow fibers were immersed into acetone and maintained at reflux temperature for 1 hour. Care was taken to contact only the exterior of hollow fibers with the solvent. Following solvent treatment hollow fibers were quenched with water, dried and heat treated at 300° C. for 0.5 hour. Hollow fibers were subjected to the RPR process by immersing fibers into solution of NMP/monoethanolamine/water 80/10/10 by volume at 80° C. for 0.5 hour only. The reservoir containing the solution was blanketed with nitrogen. The thus formed PEEK hollow fibers were washed extensively with distilled water, fresh isopropyl alcohol and dried. The hollow fiber morphology was evaluated by scanning electron microscopy, ESM. The hollow fiber cross section is shown in FIG. 8. The hollow structure consists of a thin mesoporous surface layer supported by a dense interior.

Example 9

This example describes preparation of mesoporous PEK material in a pellet format. Poly (ether ketone) and polyetherimide, PEK/PEI, blend (PEK, Victrex PEEK HT 45G and PEI Ultem 1000; 40:60 ratio by weight) was compounded in a twin extruder and pelletized. Precursor non-porous pellets were immersed into acetone and maintained at reflux temperature for 20 min. Following solvent treatment, pellets were washed with water, dried and heat treated at 300° C. for 0.5 hour. Pellets were subjected to the RPR process by immersing into solution of NMP/monoethanolamine/water 80/10/10 by volume at 80° C. for 24 hours. The reservoir containing the solution was blanketed with nitrogen. The thus formed porous PEK pellets were washed extensively with distilled water, fresh isopropyl alcohol and dried. Gravimetric analysis indicated substantially complete removal of the polyetherimide. The porous structure of porous pellets was evaluated by nitrogen adsorption BET. The nitrogen adsorption isotherms and pore size distribution are shown in FIGS. 7A and 7B, respectively. The BET surface area was 105 $m^2/g$, porosity 61% and the BJH average pore diameter of 20 nm.

While this invention has been particularly shown and described with references to preferred embodiments thereof, it will be understood by those skilled in the art that various changes in form and details may be made therein without departing from the scope of the invention encompassed by the appended claims.

What is claimed:

1. A method for adsorption or absorption based separation comprising the step of contacting a fluid containing a dissolved substance with a mesoporous poly (aryl ether ketone) material surface modified with functional groups, thereby adsorbing or absorbing at least a portion of the substance onto the mesoporous poly (aryl ether ketone) material.

2. The method of claim 1 wherein the fluid is in contact with the mesoporous poly (aryl ether ketone) material surface in a flow-through configuration.

3. The method of claim 1 wherein the mesoporous poly (aryl ether ketone) material is in the form of a microcapillary, a monofilament, a monolith, or a bead.

4. The method of claim 1 wherein the mesoporous poly (aryl ether ketone) material comprises a mesoporous layer having a thickness between about 0.1 to about 20 microns.

5. The method of claim 4 wherein the mesoporous layer is superimposed over a non-porous support such that the mesoporous poly (aryl ether ketone) material comprises a composite member.

6. The method of claim 5 wherein the composite member is formed by a process comprising the steps of:
   (a) forming a blend of a poly (aryl ether ketone) polymer with a polyimide;
   (b) forming an article from the blend by melt processing, wherein the article is substantially amorphous;
   (c) subjecting the article to a treatment step that induces crystallization in the article;
   (d) bringing the article into contact with a solution of primary amine or hydrazine to affect decomposition of the polyimide on a surface of the article to a predetermined depth to form a porous layer; and
   (e) removing products of polyimide decomposition from the surface of the article;
   (f) modifying the porous surface with functional groups via a chemical reaction or via a coating.

7. The method of claim 6 wherein the functional groups are comprised of cationic, anionic, hydrophobic, hydrophilic, thiophilic, hydrogen bond donating, hydrogen bond accepting, pi-pi bond donating, pi-pi bond accepting, or metal chelating groups or a mixture of two of these functional groups.

8. The method of claim 6 wherein the functional groups are introduced on the surface of the poly (aryl ether ketone) polymer via reaction with benzophenone segments of a polymeric backbone of the poly (aryl ether ketone) polymer.

9. The method of claim 6 wherein the crystallization of the article in step (c) is carried out via a solvent induced crystallization or a thermal induced crystallization or a combination of a solvent induced crystallization followed by a thermal induced crystallization.

10. The method of claim 1 wherein the poly (aryl ether ketone) comprises a poly (ether ketone), a poly (ether ether ketone), a poly (ether ketone ketone), a poly (ether ether ketone ketone) or a poly (ether ketone ether ketone ketone).

11. The method of claim 6 wherein the article formed in step (b) has at least one micro-channel and the polyimide in step (e) is removed from an interior surface of a micro-channel.

* * * * *